US008363381B2

(12) United States Patent
Shimanouchi et al.

(10) Patent No.: US 8,363,381 B2
(45) Date of Patent: Jan. 29, 2013

(54) VARIABLE CAPACITIVE ELEMENT, VARIABLE CAPACITIVE DEVICE, AND METHOD FOR DRIVING THE VARIABLE CAPACITIVE ELEMENT

(75) Inventors: Takeaki Shimanouchi, Kawasaki (JP); Masahiko Imai, Kawasaki (JP); Takashi Katsuki, Kawasaki (JP); Satoshi Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 12/910,267

(22) Filed: Oct. 22, 2010

(65) Prior Publication Data
US 2011/0096462 A1    Apr. 28, 2011

(30) Foreign Application Priority Data
Oct. 27, 2009    (JP) ................................. 2009-246777

(51) Int. Cl.
*H01G 5/01* (2006.01)
(52) U.S. Cl. ........ 361/287; 361/272; 361/273; 361/278; 361/279; 361/290
(58) Field of Classification Search .................. 361/287, 361/272–273, 277–279, 283.3, 290–292
See application file for complete search history.

(56) References Cited

U.S. PATENT DOCUMENTS

| | | | |
|---|---|---|---|
| 7,002,787 B2 * | 2/2006 | Nakayama | 361/277 |
| 7,161,273 B2 | 1/2007 | Akiba et al. | |
| 7,440,254 B2 * | 10/2008 | Gallant | 361/277 |
| 7,446,994 B2 * | 11/2008 | Shimanouchi et al. | 361/278 |
| 7,881,038 B2 * | 2/2011 | Nishiyama | 361/277 |
| 7,937,056 B2 * | 5/2011 | Itaya et al. | 455/191.2 |
| 2005/0030438 A1 | 2/2005 | Nishioka | |
| 2009/0244677 A1 | 10/2009 | Mizukami et al. | |

FOREIGN PATENT DOCUMENTS

| | | |
|---|---|---|
| JP | 2003-136496 | 5/2003 |
| JP | 2005-92175 | 4/2005 |
| JP | 2008-052270 | 3/2008 |

OTHER PUBLICATIONS

Chinese Official Communication dated Nov. 17, 2011 for corresponding Chinese Patent Application No. 201010532052.5, with English-language Translation.

* cited by examiner

*Primary Examiner* — Nguyen T Ha
(74) *Attorney, Agent, or Firm* — Fujitsu Patent Center

(57) ABSTRACT

A variable capacitive element includes a first fixed electrode and a second fixed electrode that are insulated from each other, a movable electrode arranged to face the first fixed electrode and the second fixed electrode, a dielectric layer provided between the movable electrode and the first fixed electrode as well as the second fixed electrode, a first wiring part for applying a first driving voltage to the first fixed electrode with reference to a potential of the movable electrode, and a second wiring part for applying a second driving voltage to the second fixed electrode with reference to the potential of the movable electrode, the second driving voltage having a polarity different from a polarity of the first driving voltage.

14 Claims, 22 Drawing Sheets

VARIABLE CAPACITIVE ELEMENT, VARIABLE CAPACITIVE DEVICE, AND METHOD FOR DRIVING THE VARIABLE CAPACITIVE ELEMENT

CROSS-REFERENCE TO RELATED APPLICATION

This application is based upon and claims the benefit of priority of the prior Japanese Patent Application No. 2009-246777, filed on Oct. 27, 2009, the entire contents of which are incorporated herein by reference.

FIELD

The embodiments discussed herein are related to a variable capacitive element, and more particularly, to a variable capacitive element produced by using Micro Electro Mechanical System (MEMS) techniques.

BACKGROUND

A variable capacitive element is a component used in an electrical circuit, such as a variable frequency oscillator, a tuned amplifier, a phase shifter, and an impedance matching circuit. In recent years, an increasing number of variable capacitive elements have been mounted in a portable device.

A variable capacitive element produced by using the MEMS techniques can realize a high Q value with small energy loss as compared to a varactor diode principally used as a variable capacitive element at present. Therefore, the variable capacitive element produced by using the MEMS techniques is expected to be developed and put to practical use.

Hereinafter, a variable capacitive element produced by using the MEMS techniques is referred to as a "variable capacitive element" simply.

In general, a variable capacitive element is so structured that the capacitance is varied by adjusting a distance between two opposed electrodes.

FIGS. 1A and 1B are cross-sectional views illustrating an example of a structure of a conventional general variable capacitive element 10.

Referring to the variable capacitive element 10 of FIG. 1A, a fixed electrode 12, a movable electrode 13, a dielectric layer 14 for covering the fixed electrode 12, a pair of support layers 15a and 15b for supporting the movable electrode 13, and the like are provided on a substrate 11. A void is provided between the movable electrode 13 and the dielectric layer 14. A driving voltage V may be applied to the fixed electrode 12. The movable electrode 13 is connected to the ground through the support layers 15a and 15b.

In the case where no potential difference is applied between the fixed electrode 12 and the movable electrode 13, the movable electrode 13 is separated from the fixed electrode 12 (see FIG. 1A). In this state, if a driving voltage V is applied to the fixed electrode 12 to apply a potential difference between the fixed electrode 12 and the movable electrode 13, an electrostatic attractive force generated therebetween attracts the movable electrode 13 closer to the fixed electrode 12, so that the distance therebetween is shortened. If the potential difference is equal to or greater than a predetermined value, the movable electrode 13 is in contact with the fixed electrode 12 through the dielectric layer 14 (see FIG. 1B).

FIG. 2 is a diagram illustrating an example of a relationship between a driving voltage V and a capacitance C, i.e., a C-V characteristic, in the variable capacitive element 10.

Referring to FIG. 2, while a positive driving voltage V is applied and the value thereof is increased, the capacitance C exhibits little change from the minimum capacitance CS in the beginning, but rapidly increases when the value of the driving voltage V is VI1 or close thereto, and then, the capacitance C exhibits little change from the maximum capacitance CL. Thereafter, when the value of the driving voltage V is reduced from this state, the capacitance C exhibits little change from the maximum capacitance CL for a while, but rapidly drops when the value of the driving voltage V is VO1 or close thereto, and then, the capacitance C exhibits little change from the minimum capacitance CS. Likewise, when a negative driving voltage V is applied and the value thereof is reduced, the capacitance C exhibits little change from the minimum capacitance CS for a while, but rapidly increases when the value of the driving voltage V is VI2 or close thereto, and then, the capacitance C exhibits little change from the maximum capacitance CL. Thereafter, when the value of the driving voltage V is increased from this state, the capacitance C exhibits little change from the maximum capacitance CL for a while, but rapidly drops when the value of the driving voltage is VO2 or close thereto, and then, the capacitance C exhibits little change from the minimum capacitance CS. As long as the capacitance C exhibits little change from the minimum capacitance CS or the maximum capacitance CL, the capacitance C is regarded as being constant at the value of the minimum capacitance CS or the maximum capacitance CL.

The capacitance C becomes the smallest value (the minimum capacitance CS) for a case where the movable electrode 13 is farthest from the fixed electrode 12, i.e., the case of FIG. 1A. The capacitance C becomes the largest value (the maximum capacitance CL) for a case where the movable electrode 13 is in contact with the fixed electrode 12 through the dielectric layer 14, i.e., the case of FIG. 1B.

In the meantime, the variation path of the capacitance C with respect to the driving voltage V is different between the case where the capacitance C increases and the case where the capacitance C drops. In short, the voltage VI1 is not equal to the voltage V01. The same is similarly applied to the voltage VI2 and the voltage VO2. It is known that the variation in the capacitance C against the driving voltage V exhibits so-called hysteresis.

In the case where the variable capacitive element 10 is used digitally, the driving voltage V is so controlled that the capacitance C of the variable capacitive element 10 takes either the minimum capacitance CS or the maximum capacitance CL. Referring to FIG. 2, for example, if the capacitance C is to be set at the minimum capacitance CS, the driving voltage V is set at a voltage VOFF (=zero). If the capacitance C is to be set at the maximum capacitance CL, the driving voltage V is set at a voltage VON1 or a voltage VON2.

In the case of changing the capacitance C, continuous application of the driving voltage V having the same polarity causes positive or negative charges to be accumulated in the dielectric layer 14. It is known that the charges are accumulated in this way.

FIGS. 3A and 3B are diagrams illustrating an example of a relationship between a driving voltage V and a capacitance C, i.e., a C-V characteristic, when charges are accumulated in the variable capacitive element 10.

When charges are accumulated in the dielectric layer 14, the movement of the movable electrode 13 is influenced by the electrostatic force due to the charges. Thus, the C-V characteristic of the variable capacitive element 10 exhibits a characteristic different from that under the state where no charges are accumulated in the dielectric layer 14. For example, FIG. 3A illustrates a state in which positive charges are accumulated in the dielectric layer 14. In this case, the C-V characteristic is shifted toward the negative driving voltage V as compared to the state in which no charges is accumulated. Further, FIG. 3B illustrates a state in which negative charges are accumulated in the dielectric layer 14. In this case, the C-V characteristic is shifted toward the positive driving voltage V as compared to the state in which no charges is accumulated.

In such cases, even if a driving voltage V that can inherently assign the capacitance C to the minimum capacitance CS or the maximum capacitance CL is applied, the value of the capacitance C does not change to the minimum capacitance CS or the maximum capacitance CL in some cases. In the illustrated examples of FIGS. 3A and 3B, even if the driving voltage V is set at the voltage VOFF (=zero), the value of the capacitance C sometimes does not change to an intended minimum capacitance CS. Thus, it is impossible to operate the variable capacitive element 10 in a stable manner, which is a problem.

In order to prevent a voltage characteristic from varying due to the charge in an insulation film, there is proposed a device in which the shape of the insulation film is improved to control the amount of the charge therein (Japanese Laid-open Patent Publication No. 2003-136496). However, it is difficult to use a semiconductor production method to form an insulation film with the shape disclosed in Japanese Laid-open Patent Publication No. 2003-136496.

To cope with this, a driving method called bipolar driving is proposed in which the polarity of a driving voltage V to be applied is turned from one to the other at predetermined time intervals to suppress the shift of the C-V characteristic.

There is also proposed a mirror control device in which a driving voltage to be applied to an electrode is an alternating voltage in order to suppress the occurrence of drift of a mirror (Japanese Laid-open Patent Publication No. 2008-052270).

FIG. 4 is a diagram illustrating an example of a time series variation of a driving voltage V and a capacitance C for a case where the variable capacitive element 10 is driven in a bipolar manner.

Referring to FIG. 4, in the bipolar driving, when the driving voltage V is applied in order to keep the capacitance C at the maximum capacitance CL, the driving voltage V is applied in such a manner that a positive voltage VON1 and a negative voltage VON2 are alternately applied at relatively short time intervals.

In the case where a driving voltage V having one polarity is applied for a long period of time, or, alternatively, in the case where a large difference is found between a period of time during which a driving voltage V having one polarity is applied and a period of time during which a driving voltage V having the other polarity is applied, charges are more likely to be accumulated in the insulation layer 14. The bipolar driving, thus, is effective to suppress the shift of the C-V characteristic.

As illustrated in FIG. 4, however, in the case of the bipolar driving, the capacitance C becomes lower than the maximum capacitance CL at a time when the polarity of the driving voltage V is turned from one to the other. In short, the bipolar driving is disadvantageous in that the capacity of the capacitance C varies. For this reason, the polarity of the driving voltage V is changed from one to the other only at a time when the capacity variation does not affect the operation of the device. This limits the cases in which the variable capacitive element 10 is driven in a bipolar manner.

SUMMARY

According to an aspect of the invention (embodiment), a variable capacitive element includes a first fixed electrode and a second fixed electrode that are insulated from each other, a movable electrode arranged to face the first fixed electrode and the second fixed electrode, a dielectric layer provided between the movable electrode and the first fixed electrode as well as the second fixed electrode, a first wiring part for applying a first driving voltage to the first fixed electrode with reference to a potential of the movable electrode, and a second wiring part for applying a second driving voltage to the second fixed electrode with reference to the potential of the movable electrode, the second driving voltage having a polarity different from a polarity of the first driving voltage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings.

In the following embodiments, descriptions take an example of the case where a variable capacitive element is used in a Radio Frequency (RF) signal processing circuit. The variable capacitive element may be also used in another application.

First Embodiment

Figure 1A:
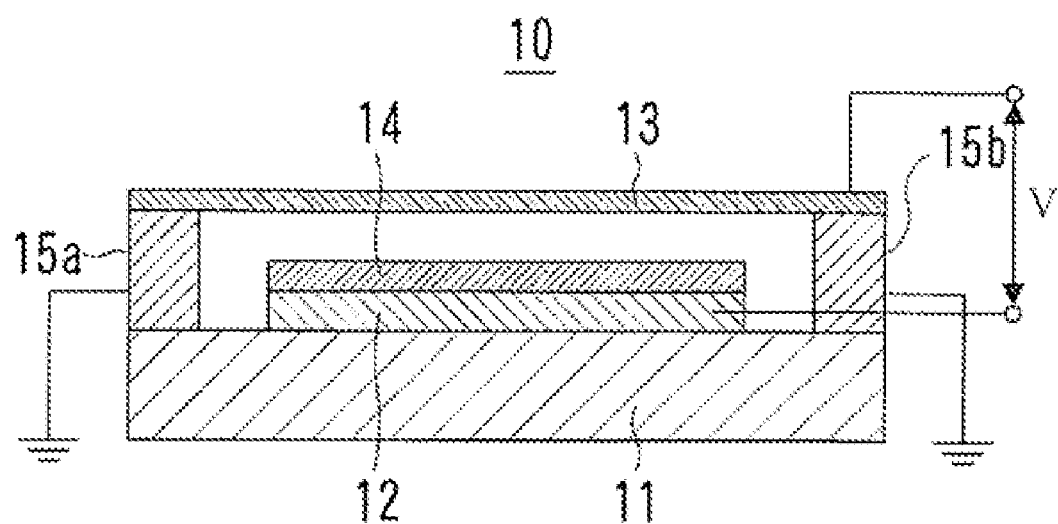
FIGS. 1A and 1B are cross-sectional views illustrating an example a structure of a conventional general variable capacitive element.
Figure 1B:
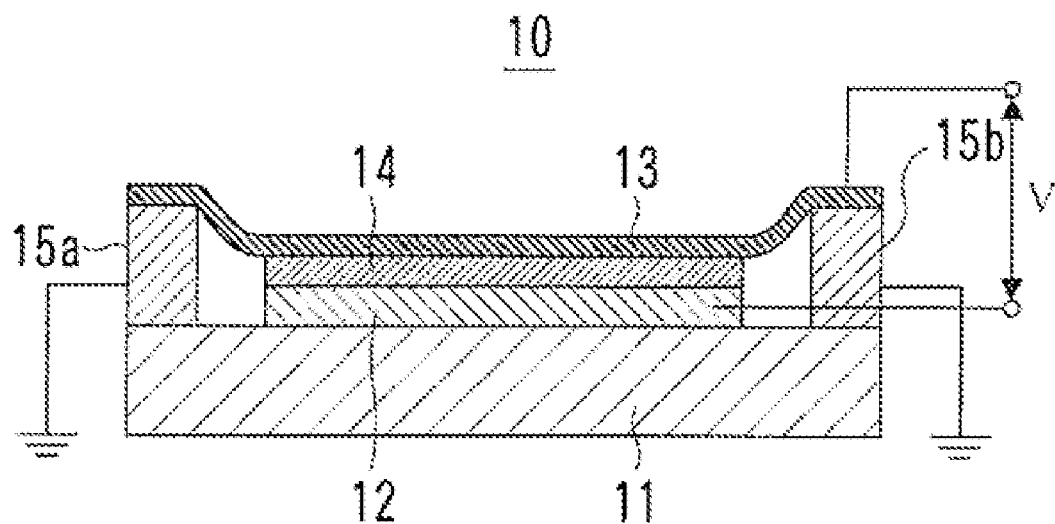
Figure 2:
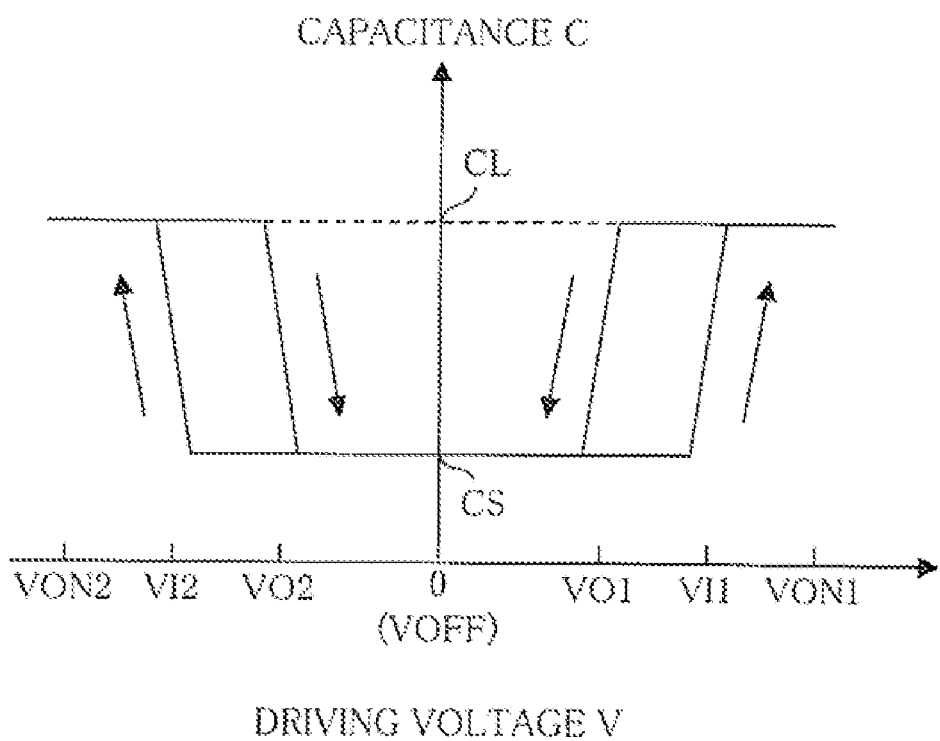
FIG. 2 is a diagram illustrating an example of a relationship between a driving voltage and a capacitance, i.e., a C-V characteristic.
Figure 3A:
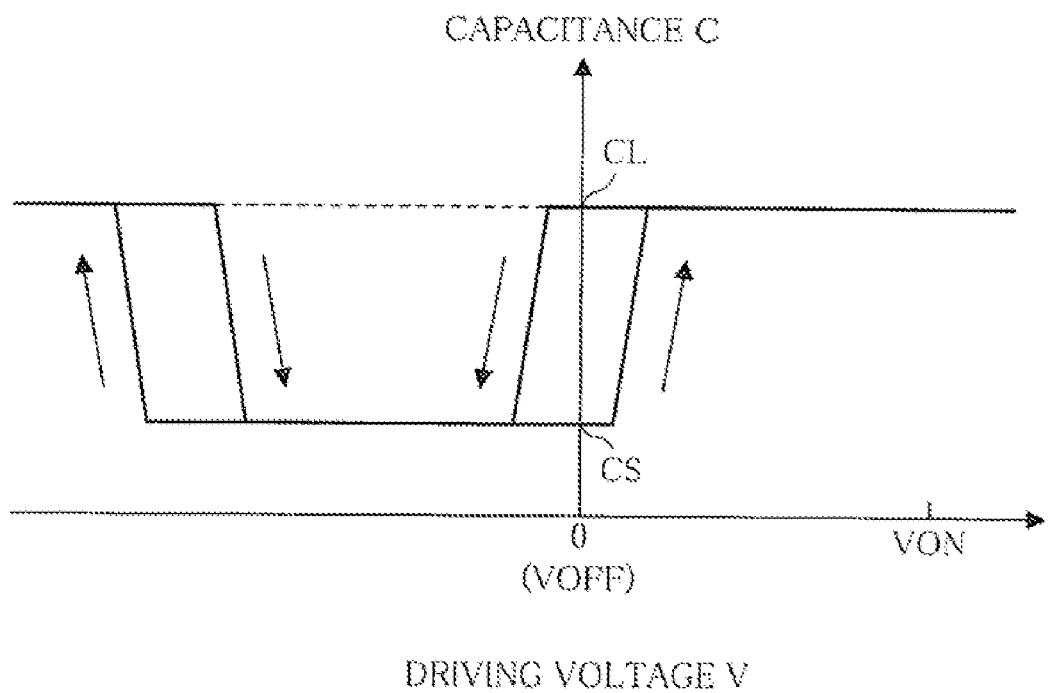
FIGS. 3A and 3B are diagrams illustrating an example of a relationship between a driving voltage and a capacitance, i.e., a C-V characteristic.
Figure 3B:
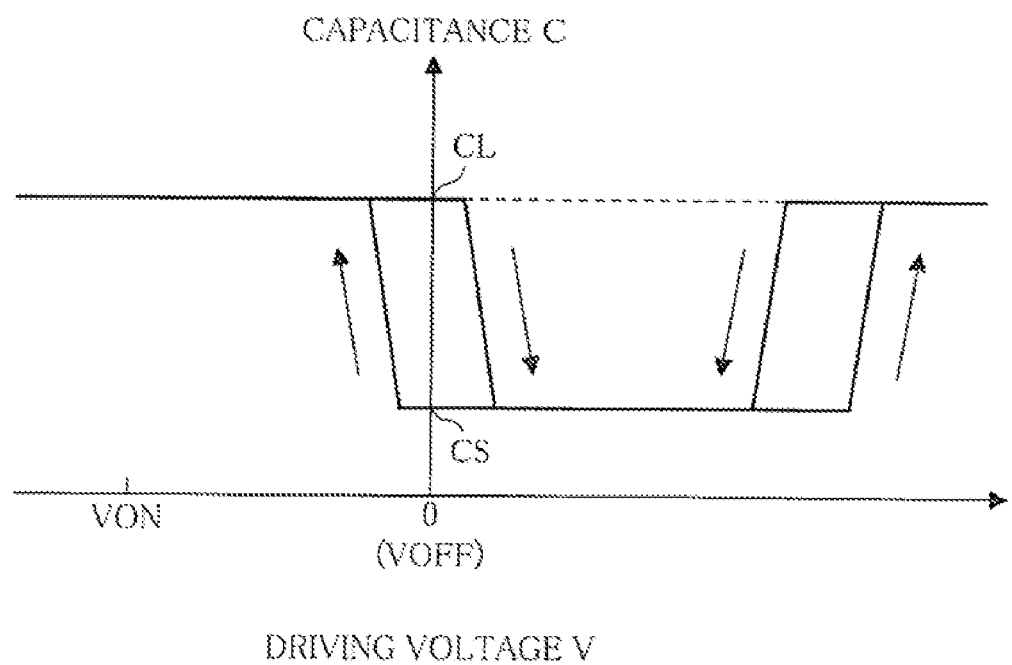
Figure 4:
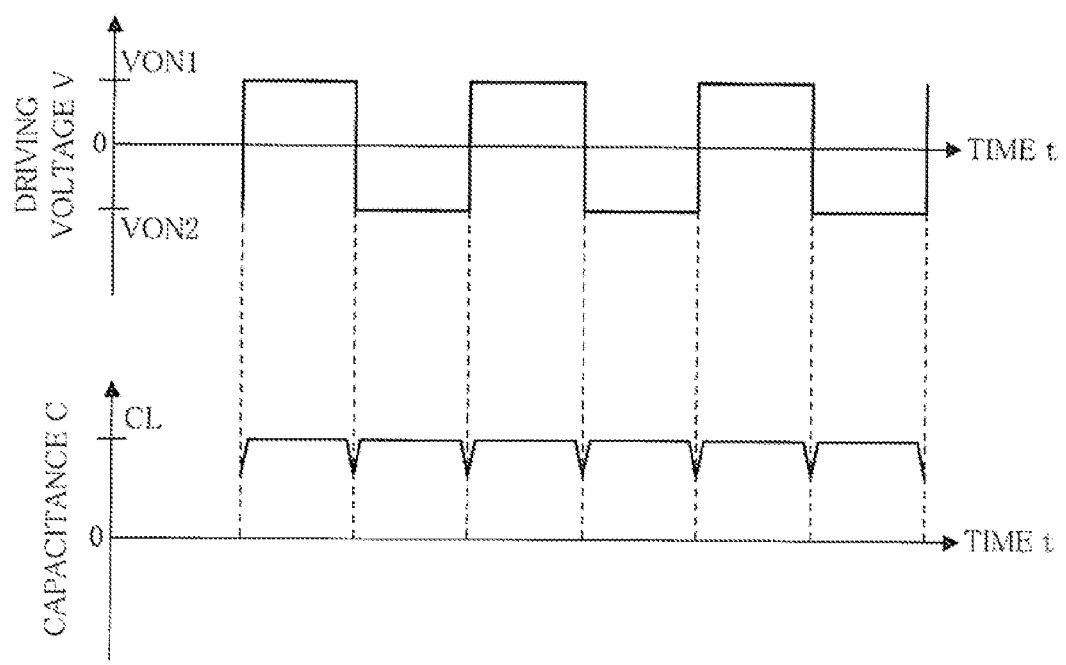
FIG. 4 is a diagram illustrating an example of a time series variation of a driving voltage and a capacitance.
Figure 5:
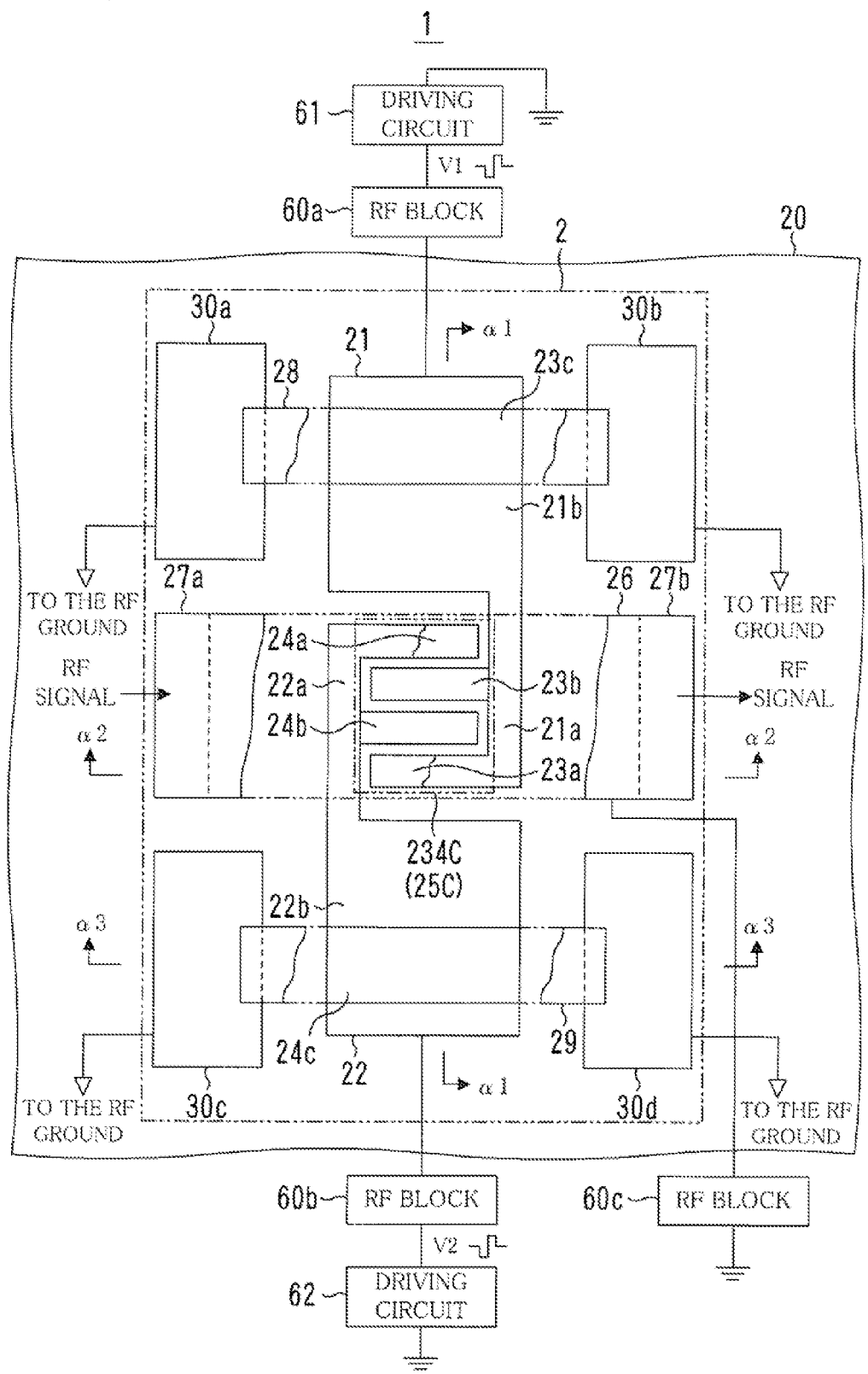
FIG. 5 is a plan view illustrating an example of a structure of a variable capacitive device according to an embodiment.
Figure 7:
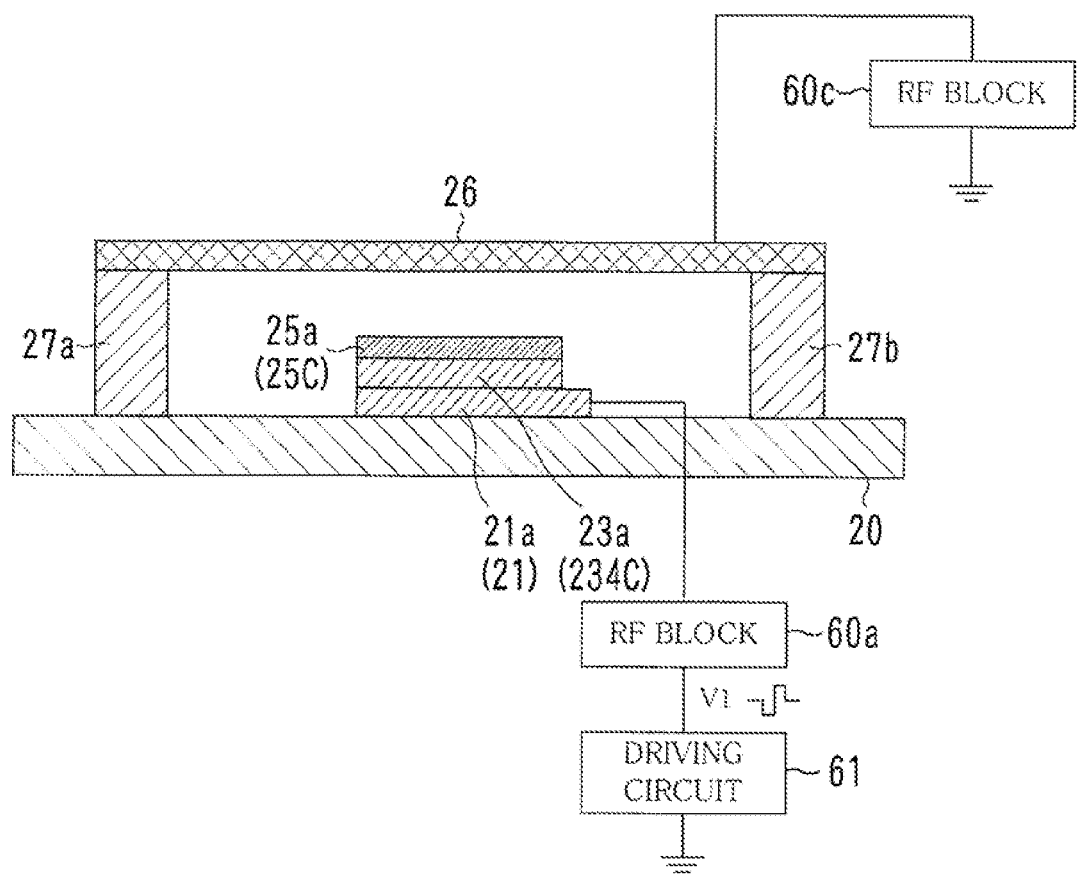
FIG. 7 is a sectional diagram of the variable capacitive device taken along the line α2-α2 of FIG. 5.
Figure 8:
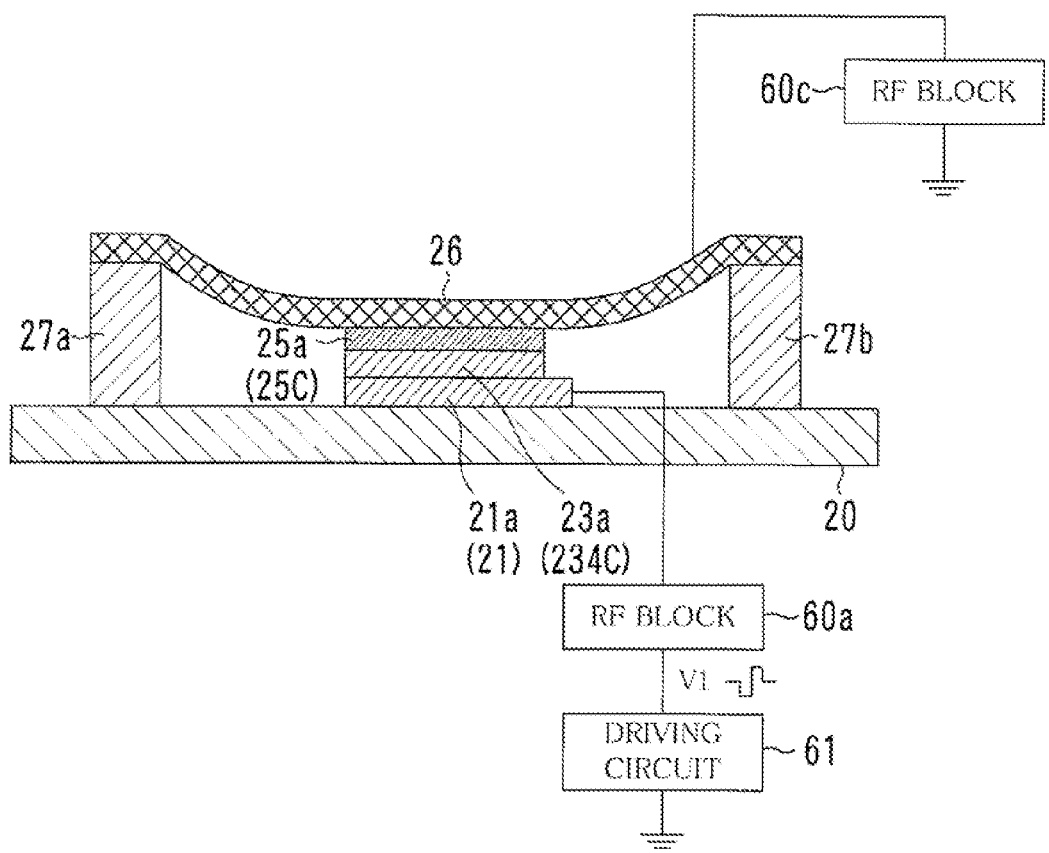
FIG. 8 is a sectional diagram of the variable capacitive device taken along the line α2-α2 of FIG. 5.

FIG. 5 is a plan view illustrating an example of a structure of a variable capacitive device 1 according to the first embodiment; FIGS. 6-9 are sectional diagrams of the variable capacitive device 1 illustrated in FIG. 5. FIGS. 7 and 8 illustrate the same cross-section. FIG. 7 illustrates the cross-section of the variable capacitive device 1 in which a movable electrode 26 is not displaced, while FIG. 8 illustrates the cross-section of the variable capacitive device 1 in which the movable electrode 26 is displaced.

Referring to FIG. 5, the variable capacitive device 1 includes a variable capacitive element 2, RF blocks 60a-60c, a driving circuit 61, and a driving circuit 62. The variable capacitive element 2 includes a substrate 20 made of glass or silicon. A first drawn electrode 21, a second drawn electrode 22, first fixed electrodes 23a-23c, second fixed electrodes 24a-24c, the movable electrode 26, support layers 27a and 27b, and the like are formed on the substrate 20. Further, a first fixed capacitive layer 28, a second fixed capacitive layer 29, ground electrodes 30a-30d, and the like are formed on the substrate 20. Dielectric layers 25a-25f are not illustrated in FIG. 5 for purposes of simplicity. Each of the movable electrode 26, the first fixed capacitive layer 28, and the second fixed capacitive layer 29 is illustrated with a part thereof cut. Likewise, each of a comb-shaped part 21a of the first drawn electrode 21 and a comb-shaped part 22a of the second drawn electrode 22 is illustrated with a part thereof cut.

The first drawn electrode 21 is made of an electrically conductive material such as aluminum (Al) or gold (Au). The first drawn electrode 21 is formed to have the comb-shaped part 21a and a rectangular part 21b. Likewise, the second drawn electrode 22 is also made of a conductive material such as aluminum (Al) or gold (Au). The second drawn electrode 22 is formed to have the comb-shaped part 22a and a rectangular part 22b. The number of teeth of the comb-shaped part 21a is equal to the number of teeth of the comb-shaped part 22a, and the number thereof is one or more. In this embodiment, the number of teeth of each of the comb-shaped part 21a and the comb-shaped part 22a is two. The first drawn electrode 21 and the second drawn electrode 22 are arranged in such a manner that the individual teeth of the comb-shaped part 21a and the individual teeth of the comb-shaped part 22a are alternated at regular intervals.

The first drawn electrode 21 and the second drawn electrode 22 are respectively connectable to driving circuits for applying driving voltages. In this embodiment, the first drawn electrode 21 is connected to the driving circuit 61 through the RF block 60a. The second drawn electrode 22 is connected to the driving circuit 62 through the RF block 60b. The RF blocks 60a and 60b are elements such as resistors or inductors for interrupting RF signals. Driving voltages applied by the driving circuit 61 and the driving circuit 62 are described later.

Figure 6:
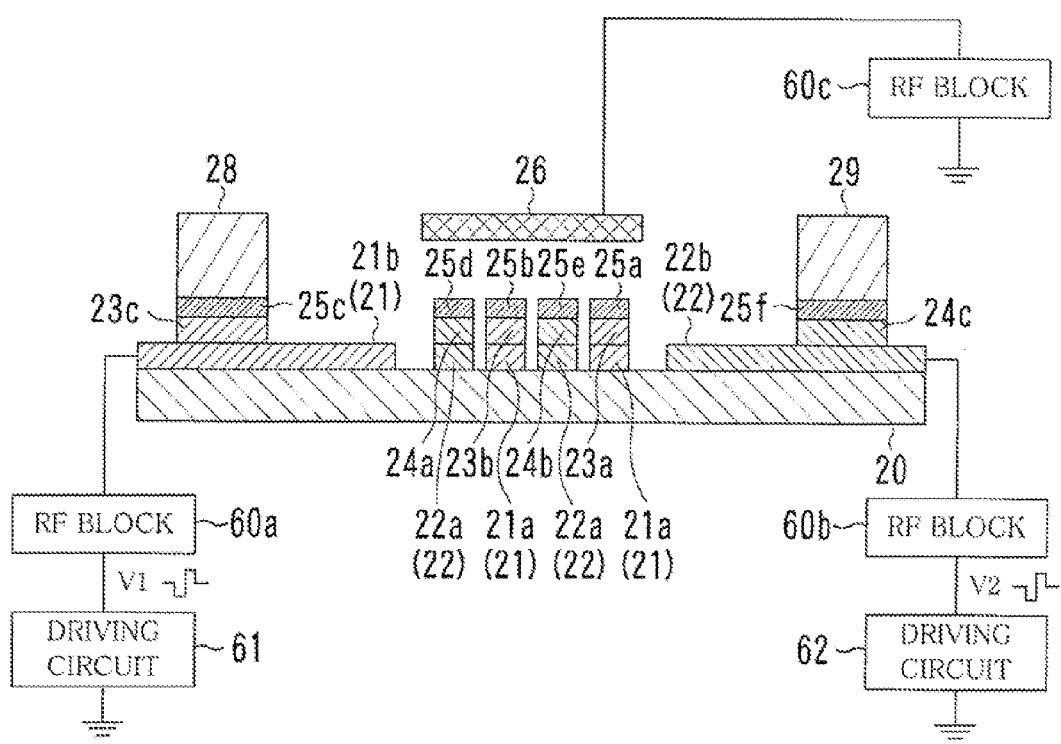
FIG. 6 is a sectional diagram of the variable capacitive device taken along the line α1-α1 of FIG. 5.

Referring also to FIG. 6, the first fixed electrodes 23a-23c are made of a conductive material such as aluminum (Al) or gold (Au), and are formed separately on the upper surface of the first drawn electrode 21. To be specific, the first fixed electrodes 23a and 23b are formed on the upper surfaces of the teeth of the comb-shaped part 21a. The first fixed electrode 23c is formed on the upper surface of the rectangular part 21b at a part close to an end of the rectangular part 21b. The second fixed electrodes 24a-24c are also made of a conductive material such as aluminum (Al) or gold (Au), and are formed separately on the upper surface of the second drawn electrode 22. To be specific, the second fixed electrodes 24a and 24b are formed on the upper surfaces of the teeth of the comb-shaped part 22a. The second fixed electrode 24c is formed on the upper surface of the rectangular part 22b at a part close to an end of the rectangular part 22b. Instead, however, a part or the whole of the first fixed electrodes 23a-23c may be integrally formed with the first drawn electrode 21. Likewise, a part or the whole of the second fixed electrodes 24a-24c may be integrally formed with the second drawn electrode 22.

Hereinafter, an area occupied by the first fixed electrodes 23a and 23b, and the second fixed electrodes 24a and 24b is sometimes called a fixed electrode center part 234C.

The dielectric layers 25a-25c made of a dielectric material such as oxide silicon ($SiO_2$) or alumina ($Al_2O_3$) are respectively formed on the upper surfaces of the first fixed electrodes 23a-23c. Likewise, the dielectric layers 25d-25f also made of a dielectric material such as oxide silicon ($SiO_2$) or alumina ($Al_2O_3$) are respectively formed on the upper surfaces of the second fixed electrodes 24a-24c.

Hereinafter, an area occupied by the dielectric layers 25a, 25b, 25d, and 25e is sometimes called a dielectric layer center part 25C.

Referring also to FIGS. 6 and 7, the movable electrode 26 is made of a conductive material such as aluminum (Al) or gold (Au). The movable electrode 26 and the upper surface of the fixed electrode center part 234C face each other with the dielectric layer center part 25C interposed therebetween. The movable electrode 26 is formed to have a bridge shape and to cross over the dielectric layer center part 25C and the fixed electrode center part 234C.

A pair of the support layers 27a and 27b made of a conductive material such as aluminum (Al) or gold (Au) are formed on the lower surfaces of the both ends of the movable electrode 26 along the direction perpendicular to the cross-over direction. The movable electrode 26 is supported by the support layers 27a and 27b. A void is provided between the movable electrode 26 and the dielectric layer center part 25C.

If a potential (electric potential) difference exists between the movable electrode 26 and the first fixed electrodes 23a and 23b, the movable electrode 26 is attracted toward the first fixed electrodes 23a and 23b due to the electrostatic attractive force generated between the movable electrode 26 and the first fixed electrodes 23a and 23b. Likewise, if a potential difference exists between the movable electrode 26 and the second fixed electrodes 24a and 24b, the movable electrode 26 is attracted toward the second fixed electrodes 24a and 24b due to the electrostatic attractive force generated between the movable electrode 26 and the second fixed electrodes 24a and 24b. When the combination of the former electrostatic attractive force and the latter electrostatic attractive force is a certain value or more, the movable electrode 26 comes into contact with the fixed electrode center part 234C through the dielectric layer center part 25C as illustrated in FIG. 8. The movable electrode 26, thus, acts as a spring member. A spring constant of the movable electrode 26 is adjustable by modifying the material or the size of the movable electrode 26, or, modifying the material or the size of the support layers 27a and 27b.

The movable electrode 26 is connectable to the ground of power sources of the driving circuit 61, the driving circuit 62, and the like. The movable electrode 26 may be connectable thereto through the support layers 27a and 27b, or the like. In this embodiment, the movable electrode 26 is connected to the ground of the power source through the RF block 60c. The RF block 60c is an element such as a resistor or an inductor for interrupting RF signals.

The movable electrode 26 is so formed that RF signals pass from one end of the movable electrode 26 to the other end along the cross-over direction. Stated differently, the movable electrode 26 functions as an electrode plate of the variable capacitive element 2 and also as a signal line for the RF signals.

Figure 9:
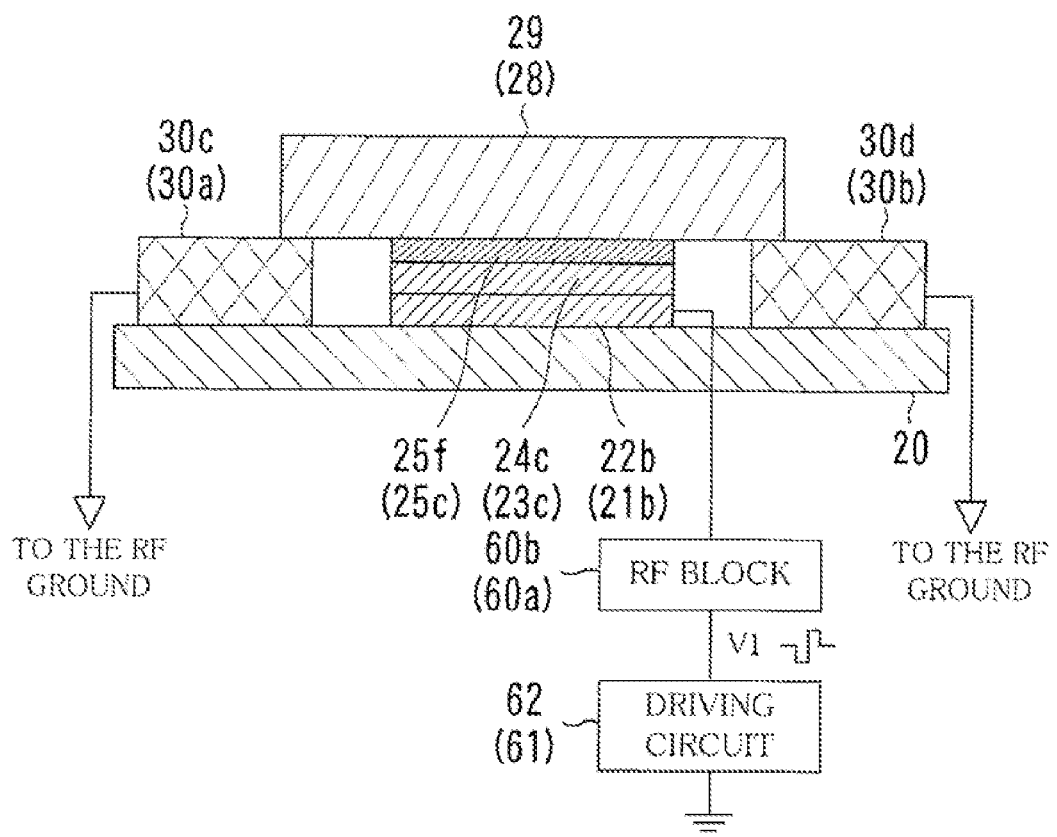
FIG. 9 is a sectional diagram of the variable capacitive device taken along the line α3-α3 of FIG. 5.

Referring also to FIGS. 6 and 9, the first fixed capacitive layer 28 is made of a conductive material such as aluminum (Al) or gold (Au). The first fixed capacitive layer 28 and the upper surface of the first fixed electrode 23c face each other with the dielectric layer 25c interposed therebetween. The first fixed capacitive layer 28 is formed to have a bridge shape and to cross over the dielectric layer 25c and the first fixed electrode 23c. The second fixed capacitive layer 29 is also made of a conductive material such as aluminum (Al) or gold (Au). The second fixed capacitive layer 29 and the upper surface of the second fixed electrode 24c face each other with the dielectric layer 25f interposed therebetween. The second fixed capacitive layer 29 is formed to have a bridge shape and to cross over the dielectric layer 25f and the second fixed electrodes 24c.

A pair of the ground electrodes 30a and 30b made of a conductive material such as aluminum (Al) or gold (Au) are formed on the lower surfaces of the both ends of the first fixed capacitive layer 28 along the direction perpendicular to the cross-over direction. Likewise, a pair of the ground electrodes 30c and 30d also made of a conductive material such as aluminum (Al) or gold (Au) are formed on the lower surfaces of the both ends of the second fixed capacitive layer 29 along the direction perpendicular to the cross-over direction. Unlike the case of the void between the movable electrode 26 and the dielectric layer center part 25C, there is no void between the first fixed capacitive layer 28 and the dielectric layer 25c, and there is no void between the second fixed capacitive layer 29 and the dielectric layer 25f.

The first fixed capacitive layer 28 is connectable to the ground for RF signals through the ground electrodes 30a and 30b. Likewise, the second fixed capacitive layer 29 is connectable to the ground for RF signals through the ground electrodes 30c and 30d.

The driving circuit 61 is a circuit for applying a driving voltage V1 to the first fixed electrodes 23a-23c through the first drawn electrode 21. If the driving voltage V1 is applied to the first fixed electrodes 23a-23c, a potential difference is generated between the first fixed electrodes 23a and 23b and the movable electrode 26 connected to the ground of the power source, and further, a potential difference is generated between the first fixed electrode 23c and the first fixed capacitive layer 28 connected to the ground for RF signals.

The driving circuit 62 is a circuit for applying a driving voltage V2 to the second fixed electrodes 24a-24c through the second drawn electrode 22. If the driving voltage V2 is applied to the second fixed electrodes 24a-24c, a potential difference is generated between the second fixed electrodes 24a and 24b and the movable electrode 26 connected to the ground of the power source, and further, a potential difference is generated between the second fixed electrode 24c and the second fixed capacitive layer 29 connected to the ground for RF signals.

As described above, when the combination of the electrostatic attractive force between the movable electrode 26 and the first fixed electrodes 23a and 23b, and the electrostatic attractive force between the movable electrode 26 and the second fixed electrodes 24a and 24b is a certain value or more, the movable electrode 26 comes into contact with the fixed electrode center part 234C through the dielectric layer center part 25C.

The capacitance between the movable electrode 26 and the first fixed electrodes 23a and 23b becomes the smallest value, and the capacitance between the movable electrode 26 and the second fixed electrodes 24a and 24b also becomes the smallest value in a state as illustrated in FIG. 7 where the movable electrode 26 is farthest from the fixed electrode center part 234C. As a result, the entire variable capacitive element 2 has a minimum capacitance. Meanwhile, the capacitance between the movable electrode 26 and the first fixed electrodes 23a and 23b becomes the largest value, and the capacitance between the movable electrode 26 and the second fixed electrodes 24a and 24b also becomes the largest value in a state as illustrated in FIG. 8 where the movable electrode 26 is in contact with the fixed electrode center part 234C through the dielectric layer center part 25C. As a result, the entire variable capacitive element 2 has a maximum capacitance. Stated differently, the capacitance of the entire variable capacitive element 2 varies between two values, i.e., a large value and a small value depending on the change of the driving voltage V1 applied by the driving circuit 61 and the change of the driving voltage V2 applied by the driving circuit 62.

Figure 10A:
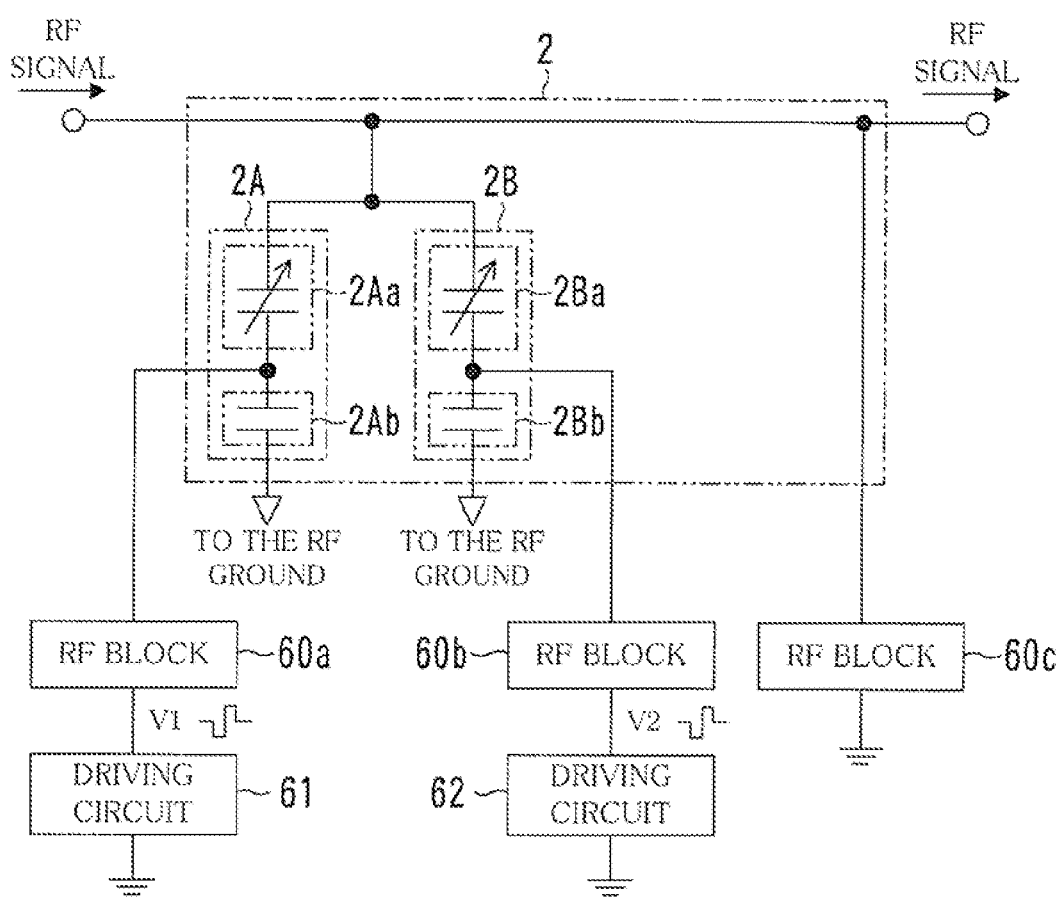
FIGS. 10A and 10B are diagrams illustrating equivalent circuits of the variable capacitive device illustrated in FIG. 5.
Figure 10B:
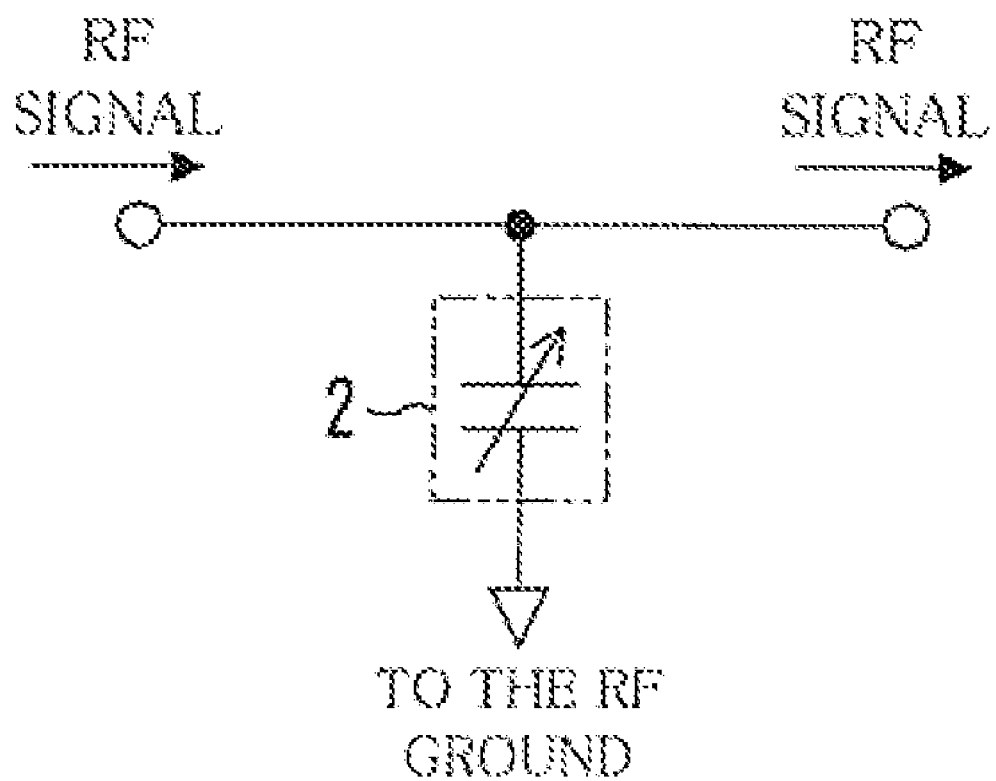
Figure 11:
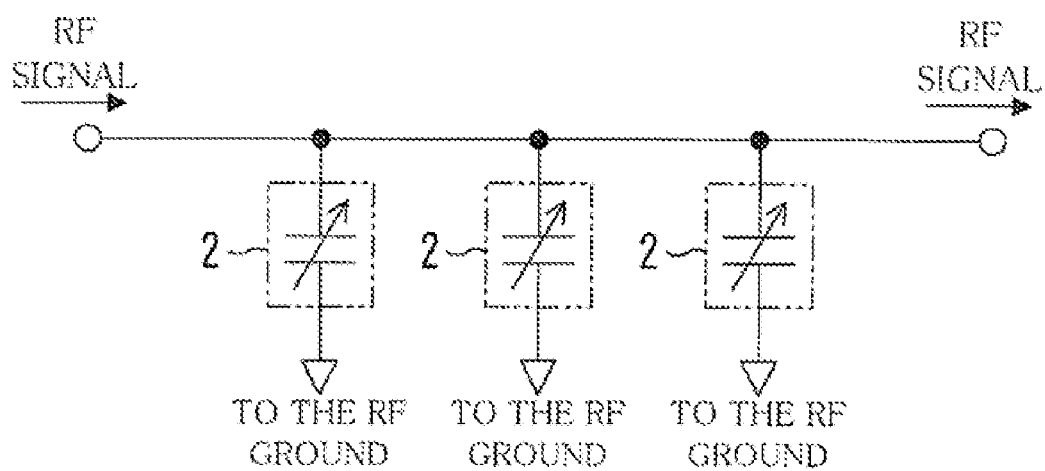
FIG. 11 is a diagram illustrating an equivalent circuit of an example of the application of a variable capacitive element according to an embodiment.

FIGS. 10A and 10B are diagrams illustrating equivalent circuits of the variable capacitive device 1 of FIG. 5, and FIG. 11 is diagram illustrating an equivalent circuit of an example of the application of the variable capacitive element 2.

Referring to FIG. 10A, the variable capacitive element 2 is realized by a first variable capacitive part 2A and a second variable capacitive part 2B connected in parallel with each other. The first variable capacitive part 2A is realized by a first variable capacitive element 2Aa and a first fixed capacitive element 2Ab connected in series with each other. The second variable capacitive part 2B is realized by a second variable capacitive element 2Ba and a second fixed capacitive element 2Bb in series with each other.

The first variable capacitive element 2Aa includes the first fixed electrodes 23a and 23b, the movable electrode 26, the dielectric layers 25a and 25b provided between the movable electrode 26 and the first fixed electrodes 23a and 23b. The first fixed capacitive element 2Ab includes the first fixed electrode 23c, the first fixed capacitive layer 28, and the dielectric layer 25c provided between the first fixed electrode 23c and the first fixed capacitive layer 28. The second variable capacitive element 2Ba includes the second fixed electrodes 24a and 24b, the movable electrode 26, and the dielectric layers 25d and 25e provided between the movable electrode 26 and the second fixed electrodes 24a and 24b. The second fixed capacitive element 2Bb includes the second fixed electrode 24c, the second fixed capacitive layer 29, and the dielectric layer 25f provided between the second fixed electrode 24c and the second fixed capacitive layer 29.

The driving voltage V1 applied by the driving circuit 61 and the driving voltage V2 applied by the driving circuit 62 are controlled, so that the capacitance of the first variable capacitive element 2Aa and the capacitance of the second variable capacitive element 2Ba are varied between two values, i.e., a large value and a small value. As described above, the movable electrode 26 is commonly used in the first variable capacitive element 2Aa and the second variable capacitive element 2Ba. Accordingly, if the first variable capacitive element 2Aa has a minimum capacitance, then the second variable capacitive element 2Ba also has a minimum capacitance. If the first variable capacitive element 2Aa has a maximum capacitance, then the second variable capacitive element 2Ba also has a maximum capacitance. In short, the capacitance of the first variable capacitive element 2Aa varies in conjunction with the capacitance of the second variable capacitive element 2Ba. As a result, the capacitance of the variable capacitive element 2 varies between two values on the whole. In view of this, it is possible to replace the equivalent circuit of FIG. 10A with a simple equivalent circuit as illustrated in FIG. 10B.

Variable capacitance values, i.e., large and small capacitance values of the first variable capacitive element 2Aa and the second variable capacitive element 2Ba, the width thereof, and the like are adjusted depending on what the variable capacitive element 2 is used for. Further, fixed capacitance values of the first fixed capacitive element 2Ab and the second fixed capacitive element 2Bb are also adjusted depending on what the variable capacitive element 2 is used for. This enables the capacitance of the variable capacitive element 2 to be varied between two desired values. As illustrated in FIG. 11, for example, a plurality of variable capacitive elements 2 constitute a capacitance circuit; thereby to vary the capacitance values of the capacitance circuit as a plurality of values.

The following is a description of three examples of the driving voltage V1 applied by the driving circuit 61 and the driving voltage V2 applied by the driving circuit 62 while the capacitance C of the variable capacitive element 2 is kept at the largest value (the maximum capacitance CL).

First Application Example

Figure 12:
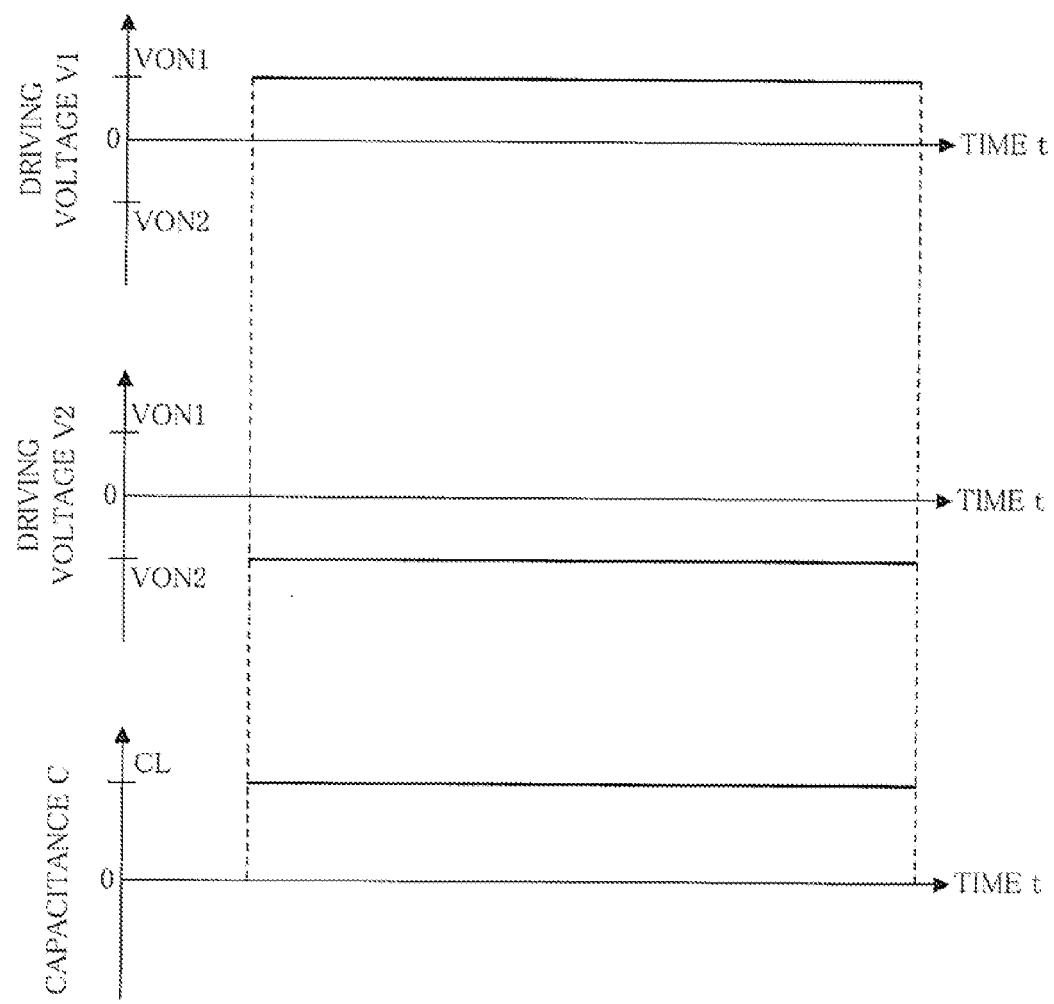
FIG. 12 a diagram illustrating an example of a time series variation of a driving voltage and a capacitance.
Figure 13A:
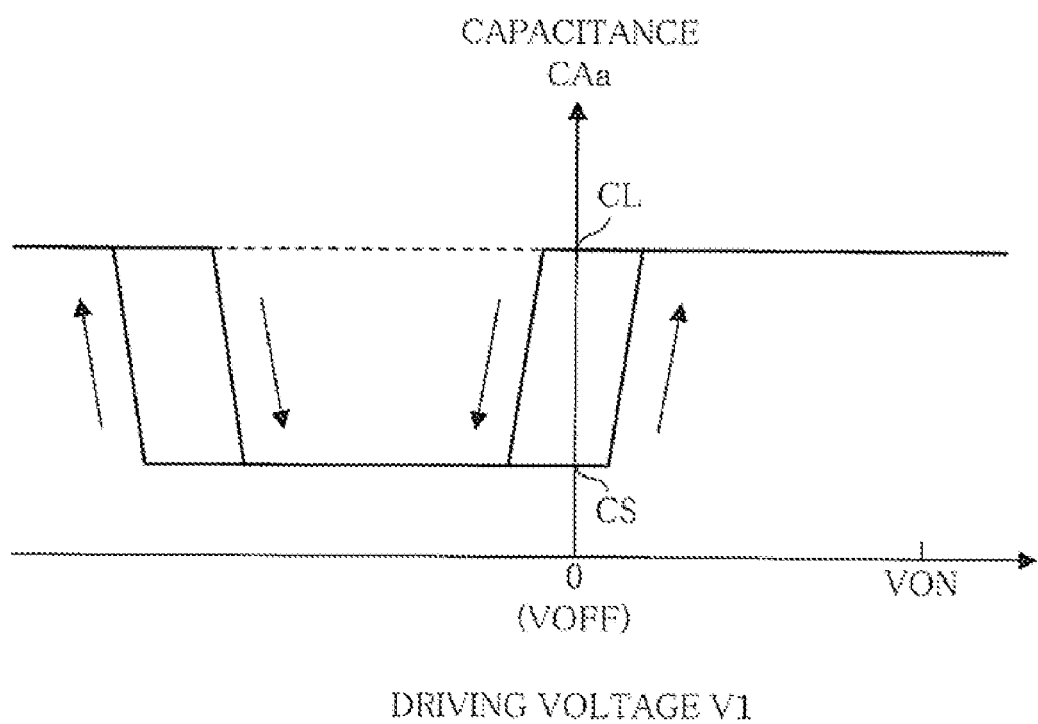
FIGS. 13A and 13B are diagrams illustrating an example of a relationship between a driving voltage and a capacitance, i.e., a C-V characteristic.
Figure 13B:
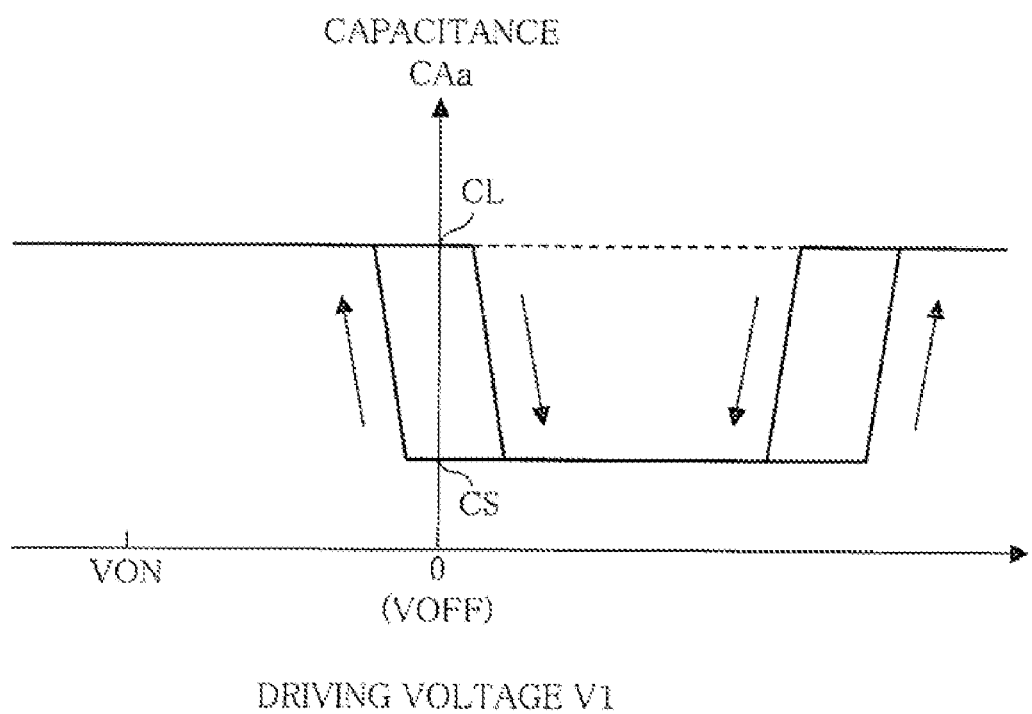
Figure 14:
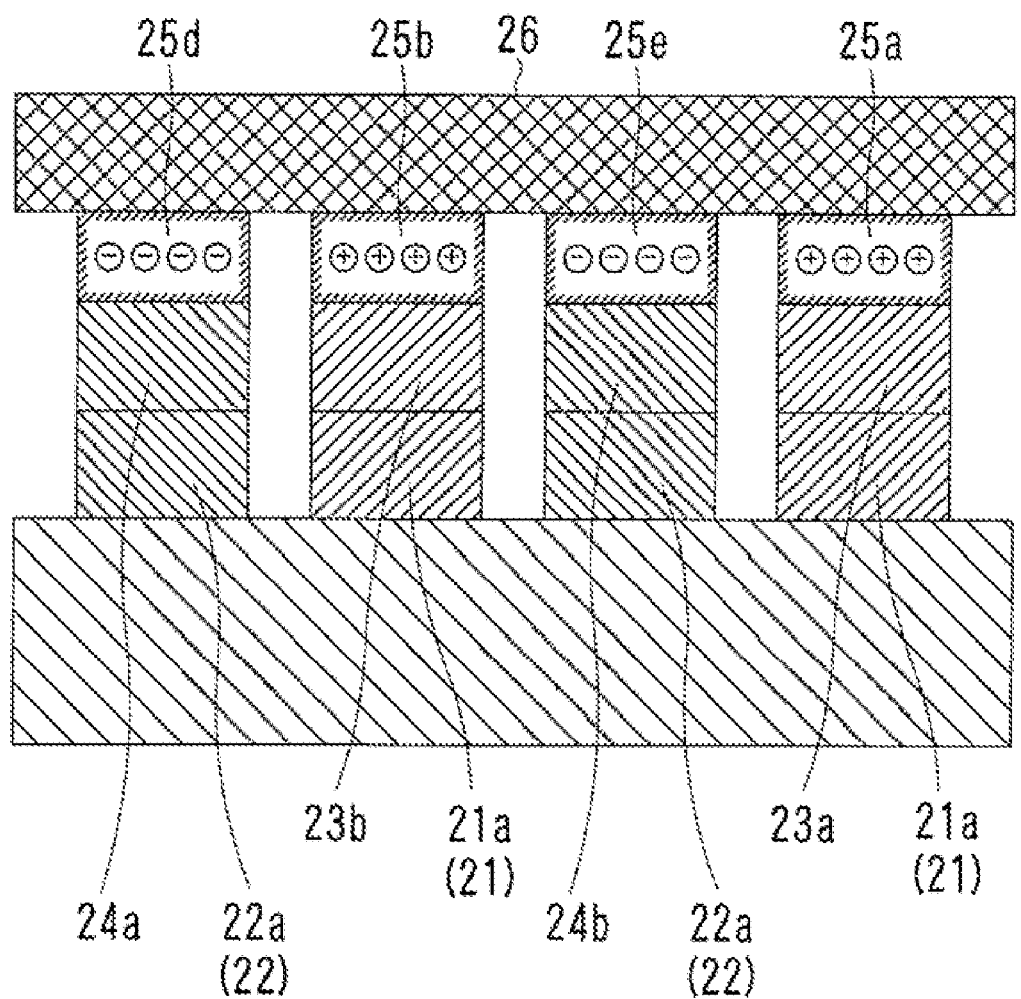
FIG. 14 is a diagram illustrating an example of a variable capacitive element in which charges are accumulated.

FIG. 12 is a diagram illustrating an example of a time series variation of the driving voltage V1, the driving voltage V2, and the capacitance C; FIGS. 13A and 13B are diagrams illustrating an example of a relationship between the driving voltage V1 and the capacitance CAa, i.e., a C-V characteristic, in a state where charges are accumulated in the variable capacitive element 2; and FIG. 14 is a diagram illustrating an example of the variable capacitive element 2 in which charges are accumulated.

In the first application example, while the capacitance C of the variable capacitive element 2 is kept at the maximum capacitance CL, the driving voltage V1 and the driving voltage V2 that have polarities different from each other and have a constant value are respectively applied to the first fixed electrodes 23a-23c and the second fixed electrodes 24a-24c. To be specific, as illustrated in FIG. 12, the driving voltage V1 is set at a constant positive voltage VON1 and the driving voltage V2 is set at a constant negative voltage VON2. Alternatively, the driving voltage V1 is set at a constant negative voltage VON2 and the driving voltage V2 is set at a constant positive voltage VON1.

The positive voltage VON1 and the negative voltage VON2 are such values that the application of both the positive voltage VON1 and the negative voltage VON2 brings the movable electrode 26 into contact with the fixed electrode center part 234C through the dielectric layer center part 25C. Alternatively, a spring constant of the movable electrode 26 is so adjusted that the application of both the positive voltage VON1 and the negative voltage VON2 brings the movable electrode 26 into contact with the fixed electrode center part 234C through the dielectric layer center part 25C. While both the positive voltage VON1 and the negative voltage VON2 basically have the same absolute value, the positive voltage VON1 and the negative voltage VON2 may have absolute values different from each other.

The driving voltage V1 and the driving voltage V2 are applied in this way, so that the capacitance C of the variable capacitive element 2 is kept at the maximum capacitance CL as illustrated in FIG. 12.

The continuous application of the driving voltage V1 and the driving voltage V2 causes positive or negative charges to be accumulated in the dielectric layers 25a-25f. The driving voltage having one polarity and the driving voltage having the other polarity are respectively applied to the first fixed electrodes 23a-23c and the second fixed electrodes 24a-24c. Accordingly, charges having one polarity and charges having the other polarity are respectively accumulated in the dielectric layers 25a-25c and the dielectric layers 25d-25f. For example, positive charges are accumulated in the dielectric layers 25a-25c, while negative charges are accumulated in the dielectric layers 25d-25f. Alternatively, negative charges are accumulated in the dielectric layers 25a-25c, while positive charges are accumulated in the dielectric layers 25d-25f.

Now, the capacitance CAa between the movable electrode 26 and the first fixed electrodes 23a and 23b is discussed. The relationship between the driving voltage V1 and the capacitance CAa, i.e., a C-V characteristic, exhibits a characteristic different from that in a state where no charges are accumulated. Under a state where positive charges are accumulated in the dielectric layers 25a and 25b, for example, as illustrated in FIG. 13A, the C-V characteristic is shifted toward the negative driving voltage V1 as compared to a state where no charges are accumulated therein. Further, under a state where negative charges are accumulated in the dielectric layers 25a and 25b, for example, as illustrated in FIG. 13B, the C-V characteristic is shifted toward the positive driving voltage V1 as compared to a state where no charges are accumulated therein. The same is similarly applied to the relationship between the driving voltage V2 and the capacitance CBa when the capacitance CBa between the movable electrode 26 and the second fixed electrodes 24a and 24b is discussed.

As described above, charges having one polarity are accumulated in the dielectric layers 25a-25c, and charges having the other polarity are accumulated in the dielectric layers 25d-25f. Thus, the shift direction of the C-V characteristic for the capacitance CAa is opposite to the shift direction of the C-V characteristic for the capacitance CBa. Consequently, the shifts counteract each other, so that no shift of the C-V characteristic occurs in the entire variable capacitive element 2, or, alternatively, slight shift of the C-V characteristic occurs therein.

At any rate, as illustrated in FIG. 14, no charges having only one of the polarities, i.e., only positive or negative polarity, are accumulated, as a whole, in the dielectric layer center part 25C that is the area occupied by the dielectric layers 25a, 25b, 25d, and 25e. Thus, the movement of the movable electrode 26 is not affected by the electrostatic force due to the charges, or, is slightly affected by the electrostatic force. As a result, the shift of the C-V characteristic of the variable capacitive element 2 involved with the accumulation of charges in the dielectric layers 25a-25f does not occur, or, a slight shift thereof occurs.

Therefore, according to the first application example, the variation (shift) of the C-V characteristic of the variable capacitive element 2 can be suppressed without changing the polarities of the driving voltages from one to the other. This leads to the stable operation of the variable capacitive element 2 for a long period of time.

Second Application Example

Figure 15:
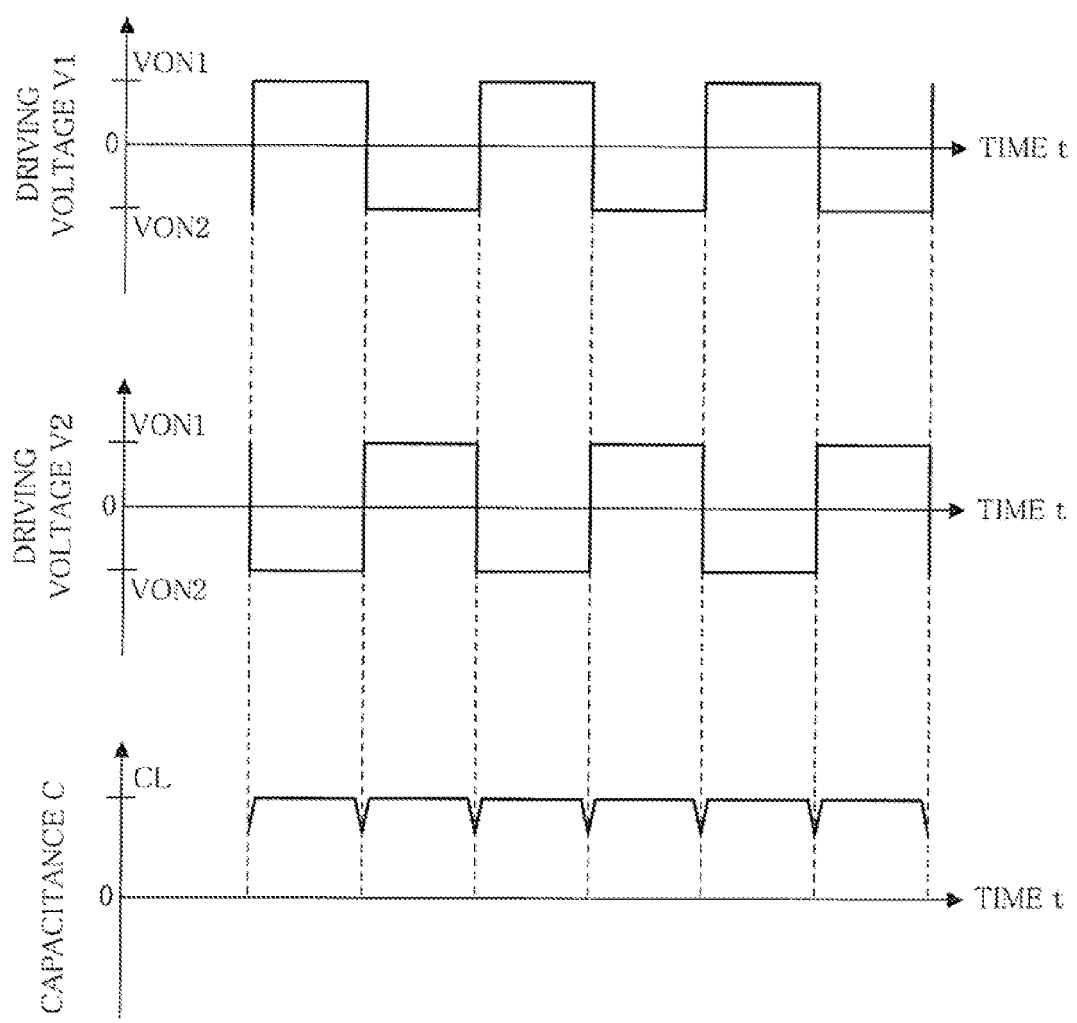
FIG. 15 is a diagram illustrating an example of a time series variation of a driving voltage and a capacitance.

FIG. 15 is a diagram illustrating an example of a time series variation of the driving voltage V1, the driving voltage V2, and the capacitance C.

The first application example suppresses the variation (shift) of the C-V characteristic of the variable capacitive element 2; however, still leaves a problem that charges are accumulated in the dielectric layers 25a-25f. The second application example is provided to improve the problem.

In the second application example, while the capacitance C of the variable capacitive element 2 is kept at the maximum capacitance CL, the driving voltage V1 and the driving voltage V2 each of which has a rectangular waveform in which positive and negative polarities are inverted at predetermined time intervals are respectively applied to the first fixed electrodes 23a-23c and the second fixed electrodes 24a-24c. Note that the polarity of the driving voltage V1 is always different from that of the driving voltage V2. In view of this, the polarities of the driving voltage V1 and the driving voltage V2 are simultaneously changed in such a manner that the driving voltage V1 and the driving voltage V2 have polarities different from each other. To be specific, as illustrated in FIG. 15, the driving voltage V1 is changed from the positive voltage VON1 to the negative voltage VON2 at the same time as when the driving voltage V2 is changed from the negative voltage VON2 to the positive voltage VON1. Further, the driving voltage V1 is changed from the negative voltage VON2 to the positive voltage VON1 at the same time as when the driving voltage V2 is changed from the positive voltage VON1 to the negative voltage VON2. In short, the driving voltage V1 and the driving voltage V2 are alternating voltages in which polarities are repeatedly inverted in such a manner that the driving voltage V1 and the driving voltage V2 have polarities different from each other.

The positive voltage VON1 and the negative voltage VON2 are such values that the application of both the positive voltage VON1 and the negative voltage VON2 brings the movable electrode 26 into contact with the fixed electrode center part 234C through the dielectric layer center part 25C. Alternatively, a spring constant of the movable electrode 26 is so adjusted that the application of both the positive voltage VON1 and the negative voltage VON2 brings the movable electrode 26 into contact with the fixed electrode center part 234C through the dielectric layer center part 25C. While both the positive voltage VON1 and the negative voltage VON2 basically have the same absolute value, the positive voltage VON1 and the negative voltage VON2 may have absolute values different from each other.

The polarities of the driving voltage V1 and the driving voltage V2 are changed basically at predetermined time intervals; however the polarities of the driving voltage V1 and the driving voltage V2 may be changed at random time intervals. The predetermined time interval corresponds to, for example, several tens of hours at longest, and a few milliseconds at shortest. Note, however, that the predetermined time interval is set at a period of time longer than a time required for the movable electrode 26 to be displaced.

The driving voltage V1 and the driving voltage V2 are applied in this way, so that the capacitance C of the variable capacitive element 2 is kept at the maximum capacitance CL or close thereto as illustrated in FIG. 15.

However, the capacitance C becomes slightly lower than the maximum capacitance CL at a time of changing the polarities of the driving voltage V1 and the driving voltage V2. Stated differently, the capacitance of the capacitance C varies at a time of changing the polarities. Further, a noise sometimes occurs at a time of changing the polarities.

In view of this, the polarities of the driving voltage V1 and the driving voltage V2 are changed at a time when the capacitance variation of the capacitance C or the noise occurrence involved with the change of polarities does not affect the operation of the device. A shorter time interval for changing the polarities is preferable because charges are difficult to be accumulated in the dielectric layers 25a-25f during the shorter time interval. Even if charges are accumulated in the dielectric layers 25a-25f, the shift of the C-V characteristic of the variable capacitive element 2 is suppressed because of the same reason as that of the first application example. Thus, it is not necessarily to change the polarities at short time intervals, and the polarities may be changed at an arbitrary timing.

Therefore, according to the second application example, the variation (shift) of the C-V characteristic of the variable capacitive element 2 can be suppressed without placing a limit on the timing at which the polarities of the driving voltages are changed. Further, charges are difficult to be accumulated in the dielectric layers 25a-25f. This leads to more stable operation of the variable capacitive element 2 for a longer period of time as compared with the case of the first application example.

Third Application Example

Figure 16:
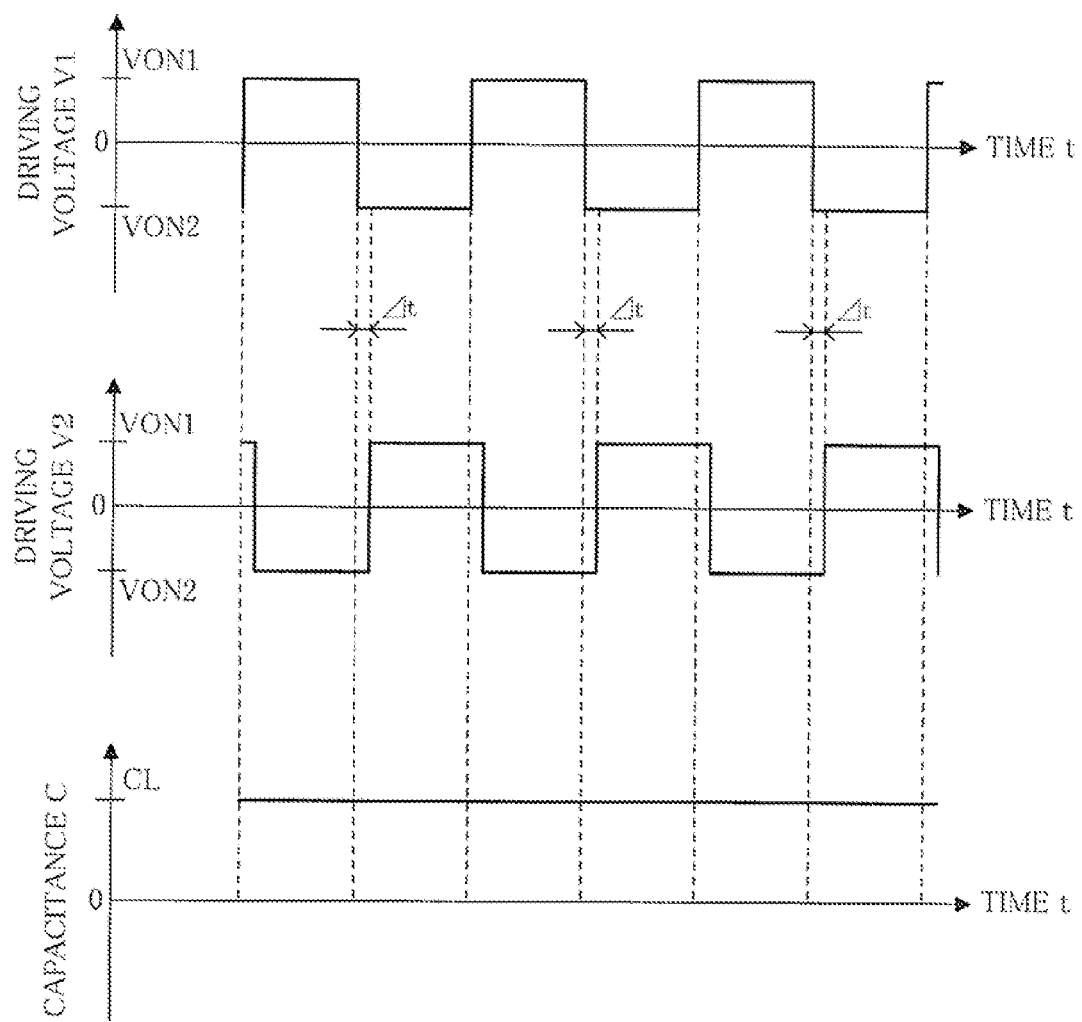
FIG. 16 is a diagram illustrating an example of a time series variation of a driving voltage and a capacitance.

FIG. 16 is a diagram illustrating an example of a time series variation of the driving voltage V1, the driving voltage V2, and the capacitance C.

According to the second application example, charges are difficult to be accumulated in the dielectric layers 25a-25f; however a problem remains that the capacitance variation of the capacitance C occurs at a time of changing the polarities of the driving voltages. The third application example is provided to improve the problem.

As with the case of the second application example, in the second application example, the polarities of the driving voltage V1 and the driving voltage V2 are changed in such a manner that the driving voltage V1 and the driving voltage V2 have polarities different from each other. Note that a time at which the polarity of the driving voltage V1 is changed is shifted, by a predetermined amount of time, from a time at which the polarity of the driving voltage V2 is changed. To be specific, as illustrated in FIG. 16, the driving voltage V1 is turned from the positive voltage VON1 to the negative voltage VON2, and, after a predetermined amount of time Δt has elapsed, the driving voltage V2 is turned from the negative voltage VON2 to the positive voltage VON1. Further, the driving voltage V1 is turned from the negative voltage VON2 to the positive voltage VON1, and, after a predetermined amount of time Δt has elapsed, the driving voltage V2 is turned from the positive voltage VON1 to the negative voltage VON2. The predetermined amount of time is, for example, a few milliseconds. In short, the driving voltage V1 and the driving voltage V2 are alternating voltages in which polarities are repeatedly inverted with the polarity inversion time shifted by a predetermined amount of time in such a manner that the driving voltage V1 and the driving voltage V2 have polarities different from each other.

The positive voltage VON1 and the negative voltage VON2 are such values that the application of at least one of the positive voltage VON1 and the negative voltage VON2 brings the movable electrode 26 into contact with the fixed electrode center part 234C through the dielectric layer center part 25C. Alternatively, a spring constant of the movable electrode 26 is so adjusted that the application of at least one of the positive voltage VON1 and the negative voltage VON2 brings the movable electrode 26 into contact with the fixed electrode center part 234C through the dielectric layer center part 25C.

Conditions other than those described above for the driving voltage V1 and the driving voltage V2 are the same as those of the second application example.

The driving voltage V1 and the driving voltage V2 are applied in this way, so that the capacitance C of the variable capacitive element 2 is kept at the maximum capacitance CL without the capacitance variation as illustrated in FIG. 16.

If a time interval for changing the polarities of the driving voltage V1 and the driving voltage V2 is extended taking the occurrence of noise into account, charges are likely to be accumulated in the dielectric layers 25*a*-25*f*. However, even if the charges are accumulated in the dielectric layers 25*a*-25*f*, the shift of the C-V characteristic of the variable capacitive element 2 is suppressed because of the same reason as those in the first and second application examples. Thus, it is not necessarily to change the polarities at short time intervals, and the polarities may be changed at an arbitrary timing.

Therefore, according to the third application example, the variation (shift) of the C-V characteristic of the variable capacitive element 2 can be suppressed without placing a limit on the timing at which the polarities of the driving voltages are changed. Further, charges are difficult to be accumulated in the dielectric layers 25*a*-25*f*, and the capacitance variation of the capacitance C does not occur at a time of changing the polarities of the driving voltages. This leads to more stable operation of the variable capacitive element 2 for a longer period of time as compared with the cases of the first and second application examples.

Second Embodiment

Figure 17:
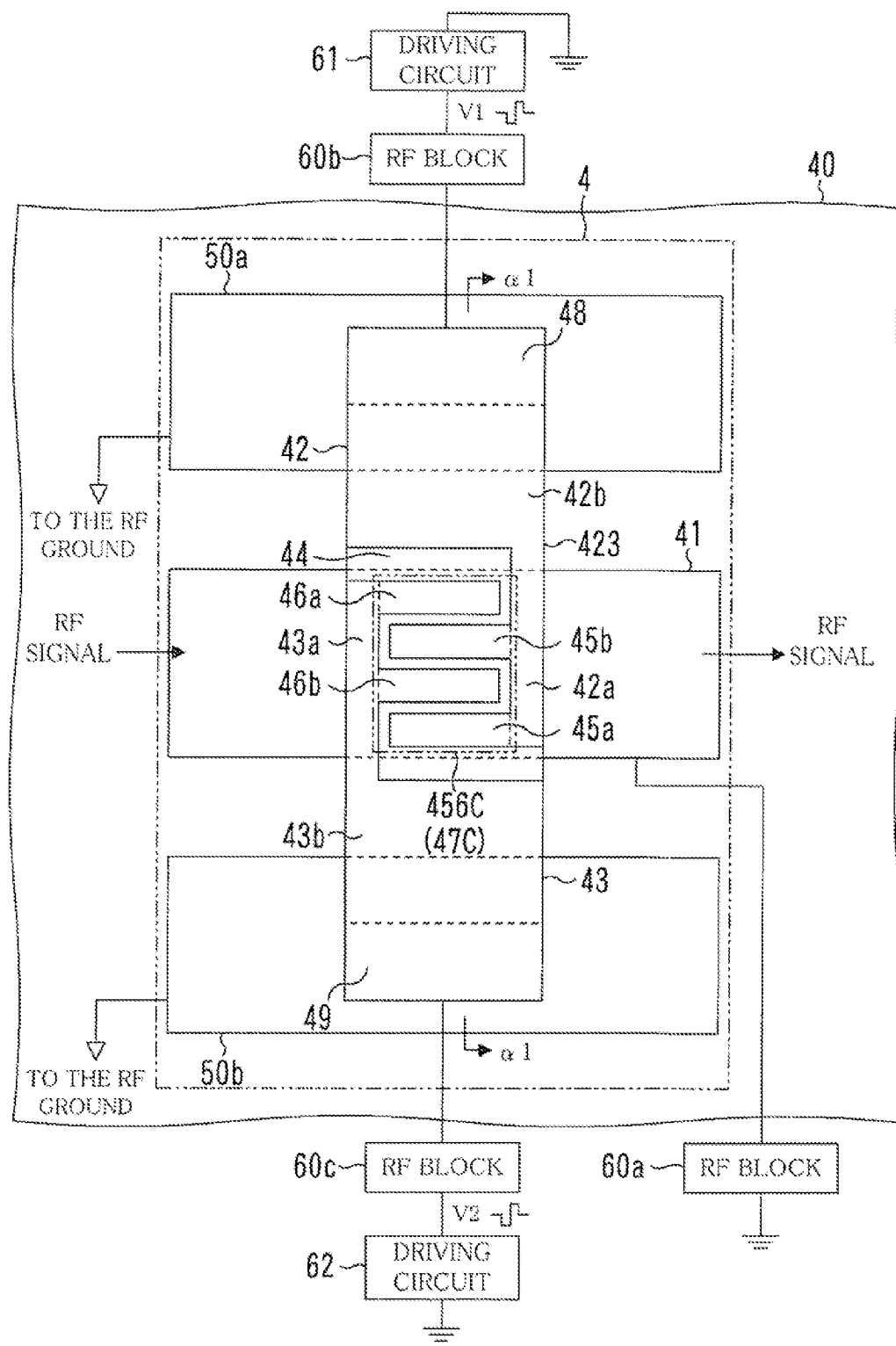
FIG. 17 is a plan view illustrating an example of a structure of a variable capacitive device according to an embodiment.
Figure 18:
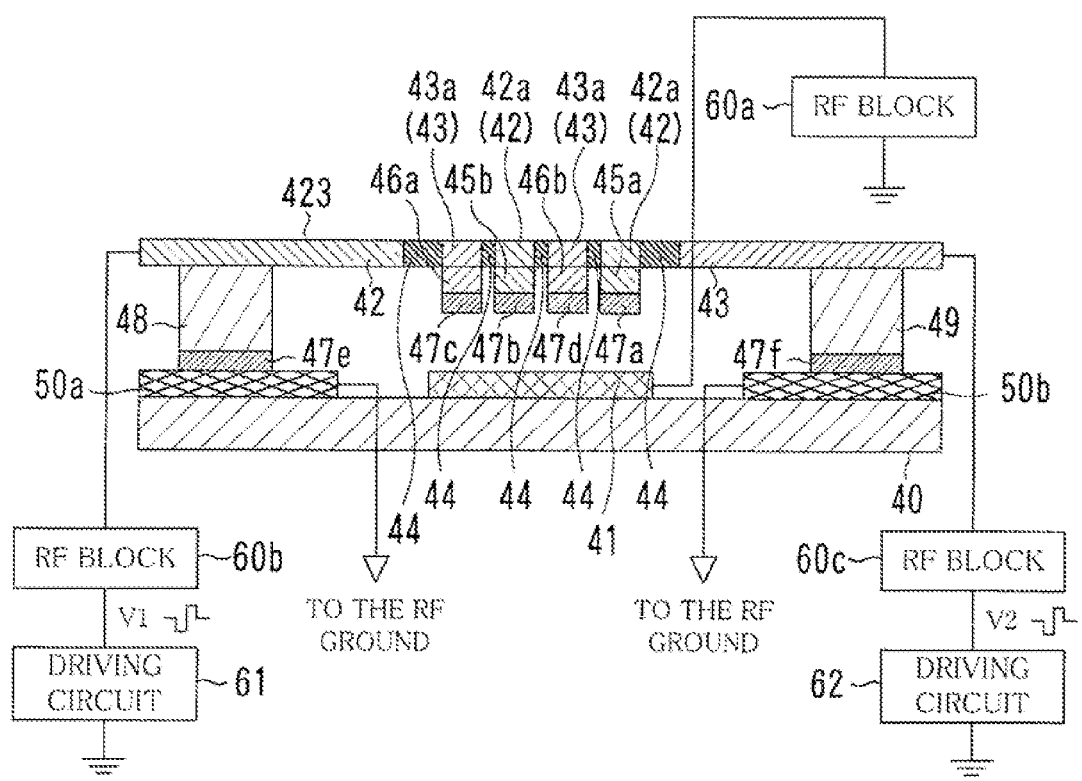
FIG. 18 is a sectional diagram of the variable capacitive device taken along the line α1-α1 of FIG. 17.

FIG. 17 is a plan view illustrating an example of a structure of a variable capacitive device 3 according to the second embodiment, and FIG. 18 is a sectional diagram of the variable capacitive device 3 taken along the line α1-α1 of FIG. 17.

The variable capacitive device 3 shall be described below, focusing on the differences between the variable capacitive device 1 and the variable capacitive device 3. Descriptions of parts that are identical with those in the variable capacitive device 1 are sometimes omitted.

Referring to FIG. 17, the variable capacitive device 3 includes a variable capacitive element 4, RF blocks 60*a*-60*c*, a driving circuit 61, and a driving circuit 62. The variable capacitive element 4 includes a substrate 40 made of glass or silicon. A fixed electrode 41, a first drawn electrode 42, a second drawn electrode 43, a connection layer 44, first movable electrodes 45*a* and 45*b*, second movable electrodes 46*a* and 46*b*, and the like are formed on the substrate 40. Further, a first fixed capacitive layer 48, a second fixed capacitive layer 49, ground electrodes 50*a* and 50*b*, and the like are formed on the substrate 40. Dielectric layers 47*a*-47*f* are not illustrated in FIG. 17 for purposes of simplicity.

The variable capacitive element 2 according to the first embodiment includes two fixed electrodes such as the first fixed electrodes 23*a*-23*c*, and the second fixed electrodes 24*a*-24*c*, and one movable electrode 26. On the other hand, the variable capacitive element 4 according to the second embodiment includes one fixed electrode 41 and two movable electrodes such as the first movable electrodes 45*a* and 45*b*, and the second movable electrodes 46*a* and 46*b*.

The individual members constituting the variable capacitive element 4 are made of the same materials as those of the individual corresponding members constituting the variable capacitive element 2. Further, the functions of the RF blocks 60*a*-60*c*, the driving circuit 61, and the driving circuit 62 are the same as those of the case of the variable capacitive device 1.

The fixed electrode 41 is connectable to the ground of power sources of the driving circuit 61, the driving circuit 62, and the like. In this embodiment, the fixed electrode 41 is connected to the ground of the power source through the RF block 60*a*. The fixed electrode 41 is so formed that RF signals pass from one end of the fixed electrode 41 to the other end. Stated differently, the fixed electrode 41 functions as an electrode plate of the variable capacitive element 4 and also as a signal line for the RF signals.

The first drawn electrode 42 has the same shape as that of the first drawn electrode 21 of the variable capacitive element 2, and is formed to have a comb-shaped part 42*a* and a rectangular part 42*b*. Likewise, the second drawn electrode 43 has the same shape as that of the second drawn electrode 22 of the variable capacitive element 2, and is formed to have a comb-shaped part 43*a* and a rectangular part 43*b*. The first drawn electrode 42 and the second drawn electrode 43 are respectively connectable to driving circuits for applying driving voltages. In this embodiment, the first drawn electrode 42 is connected to the driving circuit 61 through the RF block 60*b*. Further, the second drawn electrode 43 is connected to the driving circuit 62 through the RF block 60*c*.

The connection layer 44 made of an insulating material such as oxide silicon ($SiO_2$) or alumina ($Al_2O_3$) is formed in a gap between the first drawn electrode 42 and the second drawn electrode 43. In short, the connection layer 44 connects the first drawn electrode 42 and the second drawn electrode 43 with each other. Thereby, the first movable electrodes 45*a* and 45*b*, and the second movable electrodes 46*a* and 46*b* are combined with one another.

Hereinafter, a member constituted by the first drawn electrode 42 and the second drawn electrode 43 connected with each other is sometimes called a drawn electrode part 423.

Referring also to FIG. 18, the first movable electrodes 45*a* and 45*b* are formed on the lower surfaces of the teeth of the comb-shaped part 42*a*. The second movable electrodes 46*a* and 46*b* are formed on the lower surfaces of the teeth of the comb-shaped part 43*a*. Instead, however, a part or the whole of the first movable electrodes 45*a* and 45*b* may be integrally formed with the first drawn electrode 42. Likewise, a part or the whole of the second movable electrodes 46*a* and 46*b* may be integrally formed with the second drawn electrode 43.

Hereinafter, an area occupied by the first movable electrodes 45*a* and 45*b*, and the second movable electrodes 46*a* and 46*b* is sometimes called a movable electrode part 456C.

The dielectric layers 47*a* and 47*b* are formed on the lower surfaces of the first movable electrodes 45*a* and 45*b*, respectively. Likewise, the dielectric layers 47*c* and 47*d* are formed on the lower surfaces of the second movable electrodes 46*a* and 46*b*, respectively.

Hereinafter, an area occupied by the dielectric layers 47*a*-47*d* is sometimes called a dielectric layer center part 47C.

The drawn electrode part 423 is formed in such a manner that the movable electrode part 456C and the upper surface of the center part of the fixed electrode 41 face each other with the dielectric layer center part 47C interposed therebetween.

The drawn electrode part 423 is formed to have a bridge shape and to cross over the dielectric layer center part 47C and the fixed electrode 41.

The first fixed capacitive layer 48 is formed on the lower surface of one end of the drawn electrode part 423 along the direction perpendicular to the cross-over direction. The second fixed capacitive layer 49 is formed on the lower surface of the other end of the drawn electrode part 423 along the direction perpendicular to the cross-over direction. The drawn electrode part 423 is supported by the first fixed capacitive layer 48 and the second fixed capacitive layer 49. A void is provided between the dielectric layer center part 47C and the fixed electrode 41.

If a potential difference exists between the fixed electrode 41 and the first movable electrodes 45a and 45b, then the drawn electrode part 423 is attracted toward the fixed electrode 41 due to the electrostatic attractive force generated between the fixed electrode 41 and the first movable electrodes 45a and 45b. Likewise, if a potential difference exists between the fixed electrode 41 and the second movable electrodes 46a and 46b, then the drawn electrode part 423 is attracted toward the fixed electrode 41 due to the electrostatic attractive force generated between the fixed electrode 41 and the second movable electrodes 46a and 46b. When the combination of the former electrostatic attractive force and the latter electrostatic attractive force is a certain value or more, the drawn electrode part 423 comes into contact with the center part of the fixed electrode 41 through the dielectric layer center part 47C or the like. The drawn electrode part 423, thus, acts as a spring member. A spring constant of the drawn electrode part 423 is adjustable by modifying the material or the size of the individual members constituting the drawn electrode part 423, or, modifying the material or the size of the first fixed capacitive layer 48 and the second fixed capacitive layer 49.

The dielectric layers 47e and 47f are formed on the lower surfaces of the first fixed capacitive layer 48 and the second fixed capacitive layer 49, respectively.

The ground electrodes 50a and 50b are formed on the lower surfaces of the dielectric layers 47e and 47f, respectively. Unlike the case of the void between the dielectric layer center part 47C and the fixed electrode 41, there is no void between the dielectric layer 47e and the ground electrode 50a, and there is no void between the dielectric layer 47f and the ground electrode 50b. The ground electrodes 50a and 50b are connectable to the ground for RF signals.

As with the case of the variable capacitive element 2, the capacitance of the variable capacitive element 4 is varied between two desired values by adjusting the driving voltage V1 applied by the driving circuit 61 and the driving voltage V2 applied by the driving circuit 62. Further, while the capacitance C of the variable capacitive element 4 is kept at the largest value (the maximum capacitance CL), the driving voltage V1 and the driving voltage V2 are applied based on the first through third application examples. This makes it possible to operate the variable capacitive element 4 in a stable manner. The first drawn electrodes 21 and 42, and the second drawn electrodes 22 and 43 in the embodiments are examples of a first wiring part and a second wiring part, respectively.

In the embodiments discussed above, the overall configurations of the variable capacitive device 1, the variable capacitive element 2, the variable capacitive device 3, and the variable capacitive element 4, the configurations of various parts thereof, the shape, the material, the application thereof, and the like may be altered as required in accordance with the subject matter of the present invention. The application examples of the driving voltage V1 and the driving voltage V2 may be altered as required in accordance with the subject matter of the present invention. For example, in the embodiments discussed above, each of the variable capacitive element 2 and the variable capacitive element 4 is provided with a fixed capacitive layer to facilitate adjustment of the capacitance of the variable capacitive element 2 and the variable capacitive element 4 to a desired capacitance. However, it is not necessarily to provide the fixed capacitive layer in each of the variable capacitive element 2 and the variable capacitive element 4 as long as the capacitance is adjustable to a desired capacitance without the fixed capacitive layer. Further, in the embodiments discussed above, a dielectric layer for preventing short circuit due to the contact between a fixed electrode and a movable electrode is arranged on the side of the fixed electrode of the variable capacitive element 2, or, arranged on the side of the movable electrode of the variable capacitive element 4. Instead, however, the dielectric layer may be arranged on the movable electrode side of the variable capacitive element 2, or, arranged on the fixed electrode side of the variable capacitive element 4.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A variable capacitive element comprising:
    a first fixed electrode and a second fixed electrode that are insulated from each other;
    a movable electrode arranged to face the first fixed electrode and the second fixed electrode;
    a dielectric layer provided between the movable electrode and the first fixed electrode as well as the second fixed electrode;
    a first wiring part for applying a first driving voltage to the first fixed electrode with reference to a potential of the movable electrode; and
    a second wiring part for applying a second driving voltage to the second fixed electrode with reference to the potential of the movable electrode, the second driving voltage having a polarity different from a polarity of the first driving voltage.

2. A variable capacitive element comprising:
    a first movable electrode and a second movable electrode that are insulated from each other and are combined with each other;
    a fixed electrode arranged to face the first movable electrode and the second movable electrode;
    a dielectric layer provided between the fixed electrode and the first movable electrode as well as the second movable electrode;
    a first wiring part for applying a first driving voltage to the first movable electrode with reference to a potential of the fixed electrode; and
    a second wiring part for applying a second driving voltage to the second movable electrode with reference to the potential of the fixed electrode, the second driving voltage having a polarity different from a polarity of the first driving voltage.

3. A variable capacitive device comprising:
a variable capacitive element including
- a first fixed electrode and a second fixed electrode that are insulated from each other,
- a movable electrode arranged to face the first fixed electrode and the second fixed electrode,
- a dielectric layer provided between the movable electrode and the first fixed electrode as well as the second fixed electrode,
- a first wiring part for applying a first driving voltage to the first fixed electrode with reference to a potential of the movable electrode, and
- a second wiring part for applying a second driving voltage to the second fixed electrode with reference to the potential of the movable electrode, the second driving voltage having a polarity different from a polarity of the first driving voltage;

a first driving part that applies the first driving voltage to the first fixed electrode via the first wiring part; and
a second driving part that applies the second driving voltage to the second fixed electrode via the second wiring part.

4. The variable capacitive device according to claim 3, wherein the first driving voltage and the second driving voltage are voltages having a rectangular waveform in which polarities are repeatedly inverted in such a manner that the first driving voltage and the second driving voltage have polarities different from each other.

5. The variable capacitive device according to claim 4, wherein a time at which the polarity of the first driving voltage is inverted is different from a time at which the polarity of the second driving voltage is inverted.

6. A variable capacitive device comprising:
a variable capacitive element including
- a first movable electrode and a second movable electrode that are insulated from each other and are combined with each other,
- a fixed electrode arranged to face the first movable electrode and the second movable electrode,
- a dielectric layer provided between the fixed electrode and the first movable electrode as well as the second movable electrode,
- a first wiring part for applying a first driving voltage to the first movable electrode with reference to a potential of the fixed electrode, and
- a second wiring part for applying a second driving voltage to the second movable electrode with reference to the potential of the fixed electrode, the second driving voltage having a polarity different from a polarity of the first driving voltage;

a first driving part that applies the first driving voltage to the first movable electrode via the first wiring part; and
a second driving part that applies the second driving voltage to the second movable electrode via the second wiring part.

7. The variable capacitive device according to claim 6, wherein the first driving voltage and the second driving voltage are voltages having a rectangular waveform in which polarities are repeatedly inverted in such a manner that the first driving voltage and the second driving voltage have polarities different from each other.

8. The variable capacitive device according to claim 7, wherein a time at which the polarity of the first driving voltage is inverted is different from a time at which the polarity of the second driving voltage is inverted.

9. A method for driving a variable capacitive element, the variable capacitive element including
- a first fixed electrode and a second fixed electrode that are insulated from each other,
- a movable electrode arranged to face the first fixed electrode and the second fixed electrode, and
- a dielectric layer provided between the movable electrode and the first fixed electrode as well as the second fixed electrode, the method comprising:
applying a first driving voltage to the first fixed electrode with reference to a potential of the movable electrode; and
applying a second driving voltage to the second fixed electrode with reference to the potential of the movable electrode, the second driving voltage having a polarity different from a polarity of the first driving voltage.

10. The method according to claim 9, wherein the first driving voltage and the second driving voltage are voltages having a rectangular waveform in which polarities are repeatedly inverted in such a manner that the first driving voltage and the second driving voltage have polarities different from each other.

11. The method according to claim 10, wherein a time at which the polarity of the first driving voltage is inverted is different from a time at which the polarity of the second driving voltage is inverted.

12. A method for driving a variable capacitive element, the variable capacitive element including
- a first movable electrode and a second movable electrode that are insulated from each other and are combined with each other,
- a fixed electrode arranged to face the first movable electrode and the second movable electrode, and
- a dielectric layer provided between the fixed electrode and the first movable electrode as well as the second movable electrode, the method comprising:
applying a first driving voltage to the first movable electrode with reference to a potential of the fixed electrode; and
applying a second driving voltage to the second movable electrode with reference to the potential of the fixed electrode, the second driving voltage having a polarity different from a polarity of the first driving voltage.

13. The method according to claim 12, wherein the first driving voltage and the second driving voltage are voltages having a rectangular waveform in which polarities are repeatedly inverted in such a manner that the first driving voltage and the second driving voltage have polarities different from each other.

14. The method according to claim 13, wherein a time at which the polarity of the first driving voltage is inverted is different from a time at which the polarity of the second driving voltage is inverted.

* * * * *